United States Patent
Magouirk et al.

(10) Patent No.: US 6,941,305 B2
(45) Date of Patent: Sep. 6, 2005

(54) CUSTOMER MANAGEMENT SYSTEM FOR AUTOMOBILE SALES INDUSTRY

(75) Inventors: Brent Magouirk, Dodge City, KS (US); William B. Kennan, Galloway, OH (US); Shawn E. Wallace, Columbus, OH (US)

(73) Assignee: Symeron Software, Inc., Cimarron, KS (US)

( * ) Notice: Subject to any disclaimer, the term of this patent is extended or adjusted under 35 U.S.C. 154(b) by 482 days.

(21) Appl. No.: 10/052,575

(22) Filed: Jan. 18, 2002

(65) Prior Publication Data

US 2002/0116366 A1 Aug. 22, 2002

Related U.S. Application Data

(60) Provisional application No. 60/268,019, filed on Nov. 19, 2001.

(51) Int. Cl.[7] .............................................. G06F 17/30
(52) U.S. Cl. ..................... 707/10; 707/100; 707/102; 709/203; 705/29
(58) Field of Search .................... 707/3–5, 10, 100, 707/102, 9, 2, 104.1; 705/27–29, 34, 40, 10, 37, 26, 25; 709/203

(56) References Cited

U.S. PATENT DOCUMENTS

| | | | |
|---|---|---|---|
| 5,283,865 A | 2/1994 | Johnson | 345/854 |
| 5,367,627 A | 11/1994 | Johnson | 345/708 |
| 5,493,490 A | 2/1996 | Johnson | 705/26 |
| 5,615,342 A | 3/1997 | Johnson | 705/27 |
| 5,625,776 A | 4/1997 | Johnson | 705/27 |
| 5,758,331 A | 5/1998 | Johnson | 705/412 |
| 6,012,045 A * | 1/2000 | Barzilai et al. | 705/37 |
| 6,041,310 A * | 3/2000 | Green et al. | 705/27 |
| 6,067,525 A * | 5/2000 | Johnson et al. | 705/10 |
| 6,125,356 A * | 9/2000 | Brockman et al. | 705/37 |
| 6,141,658 A | 10/2000 | Mehr et al. | 707/7 |
| 6,169,979 B1 | 1/2001 | Johnson | 705/412 |

OTHER PUBLICATIONS

Kuang C. Wei, "Modeling the Impact of Incentives on Vehicle Sales Volume", IEEE, Sep. 5–7, 2001, pp. 1135–1140.*

* cited by examiner

*Primary Examiner*—Greta Robinson
*Assistant Examiner*—Cheryl Lewis
(74) *Attorney, Agent, or Firm*—Westman, Champlin & Kelly, P.A.

(57) ABSTRACT

A computer-implemented method of collecting client contact data is provided. The method includes the steps of opening a client ticket session to create a client ticket, supplying the client ticket with information, and closing the client ticket session after a predetermined time. Once the client ticket session is closed further alteration of the client ticket is precluded.

22 Claims, 16 Drawing Sheets

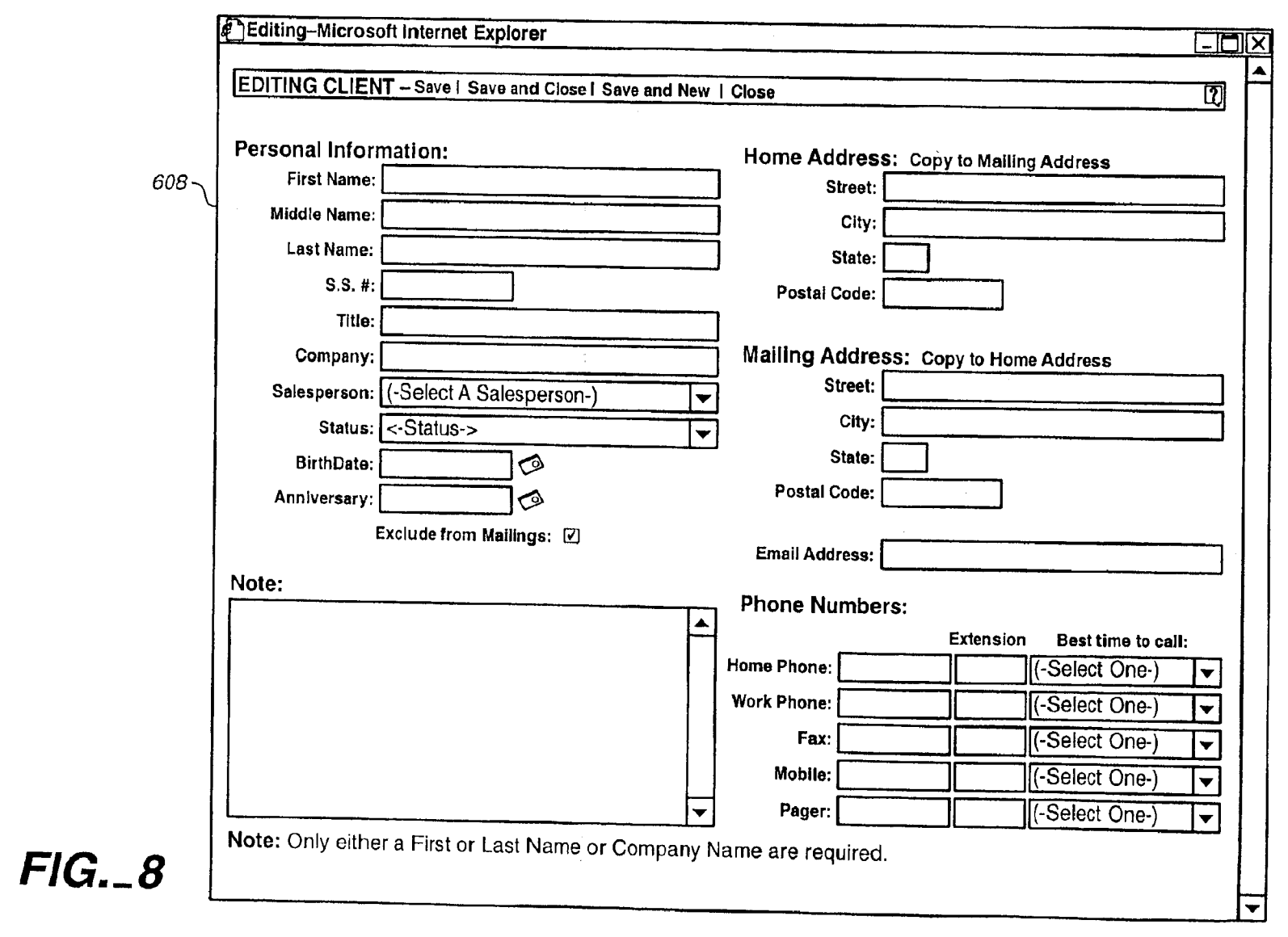

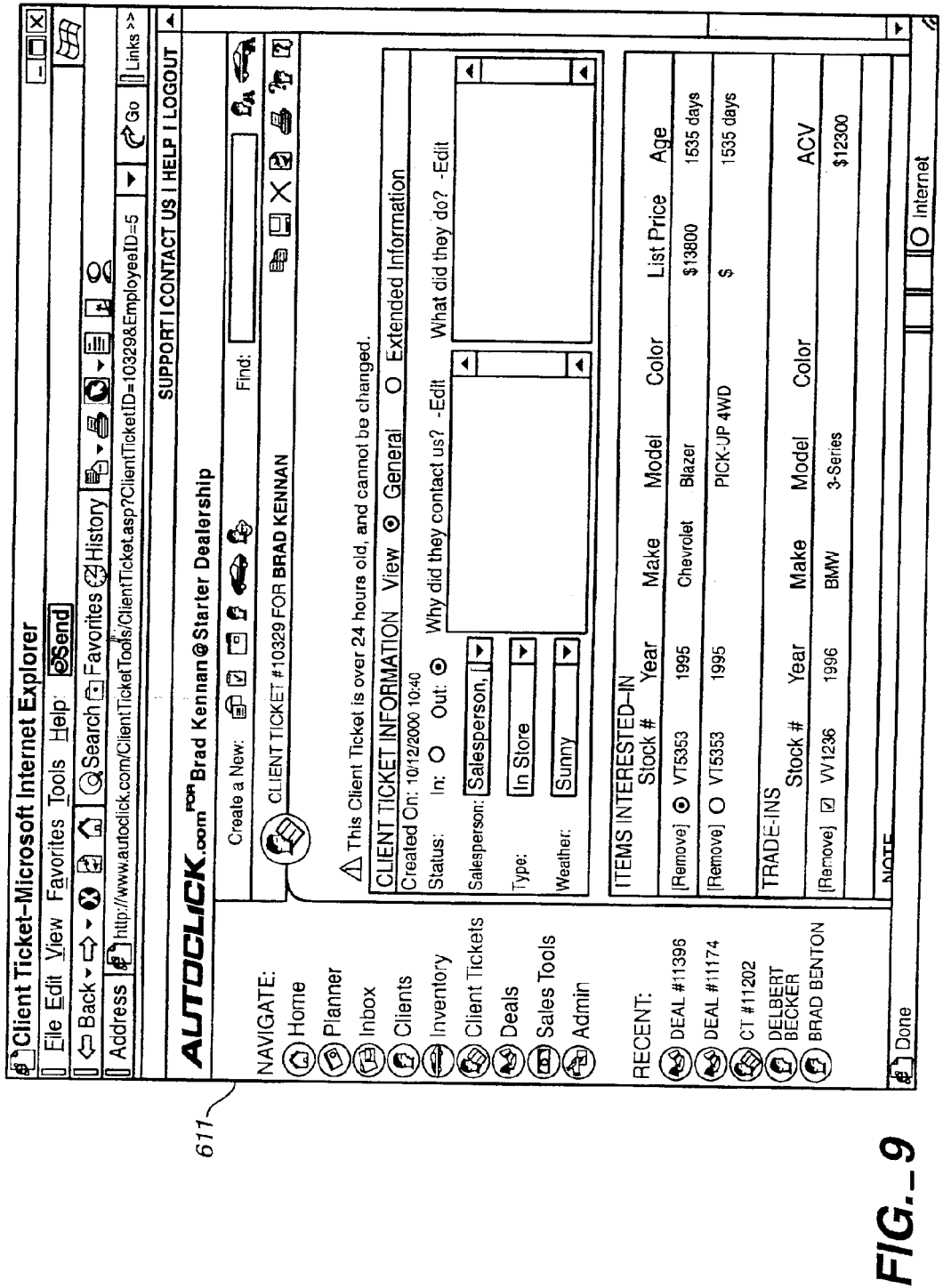
FIG._9

Creating New Item—Microsoft Internet Explorer

EDITING ITEM – Save | Save and New | Save and Close | Close

| | | | |
|---|---|---|---|
| Source: | <-Source-> ▼ | Transmission Type: | ☑ Automatic ☐ Standard |
| Status: | <-Status-> ▼ | Description: | |
| Location: | (-Select A Location-) ▼ | Engine Type: | ☑ Gas ☐ Diesel |
| Classification: | (-Select A Classification-) ▼ | Engine Size: | |
| Stock Number: | | Condition: | <-Condition-> ▼ |
| Year: | <-Year-> ▼ | Mileage: | |
| Make: | <-Manufacturer-> ▼ | Interior Color: | |
| Model: | Please select Manufacturer | Exterior Color: | |
| Model Code: | | Trim: | |
| VIN Number: | | | |

PRICING INFORMATION – Save | Close

| | | | |
|---|---|---|---|
| List Price: $ | | Cost / ACV: $ | |
| Markup: $ | | Average Wholesale: | No Values Set |
| | | Average Retail: | No Values Set |

FINANCING INFORMATION – Save | Close

| | | | |
|---|---|---|---|
| Amount Financed: $ | | Financing Type: | (-Select A Type-) ▼ |
| Term: | Months | Payment: $ | |
| Replacement Date: | | | |
| Rate: | % | Residual: | % |
| Loan Pay-off: $ | | Good Until: | mm/dd/yyyy |
| Financing Note: | | | |

BOOK VALUES – Save | Close

Black Book:                    NADA:

| | Retail: | Wholesale: | | Retail: | Wholesale: |
|---|---|---|---|---|---|
| Clean: $ | 0 | 0 | Retail: $ | 0 | |
| Average: $ | 0 | 0 | Trade-In: $ | | 0 |
| Rough: $ | 0 | 0 | Loan Value: $ | | 0 |

Kelly Blue Book:

| | Retail: $ | Wholesale: $ |
|---|---|---|
| | 0 | 0 |

FIG. 10

Inventory – Microsoft Internet Explorer

AUTOCLICK.com for Brad Kennan @ Starter Dealership

SUPPORT | CONTACT US | HELP | LOGOUT

NAVIGATE:
- Home
- Planner
- Inbox
- Clients
- Inventory
- Client Tickets
- Deals
- Sales Tools
- Admin

RECENT:
- DEAL #11396
- DEAL #11174
- CT #11202
- DELBERT BECKER
- BRAD BENTON

Create a New: [icon]  Find: [____]

VIEW  ⦿ INVENTORY   ○ LOCATES   ○ DEALER TAGS

Stock # [____]  Year [<-Year->▼]  Make [<-Manufacturer->▼]  Model [Please select Manufacturer ▼]  Source [<-Sourc ▼]  Status [Stock ▼]  Age> [___]

[CLEAR] [SEARCH]

| | Stock # | Year | Make | Model | Color | List Price | Age | Status |
|---|---|---|---|---|---|---|---|---|
| [Edit] [Delete] | VV1236 | 1996 | BMW | 3Series | | | 76 | Stock |
| [Edit] [Delete] | BM1402c | 1995 | Chevrolet | Suburban | | | 146 | Stock |
| [Edit] [Delete] | tb78762 | 2000 | Volkswagon | Cabriolet | | | 195 | Stock |
| [Edit] [Delete] | 10463 | 2000 | Chevrolet | C/K 1500 | Lt Pewter | | 198 | Stock |
| [Edit] [Delete] | T0591 | 2000 | Chevrolet | C/K 3500 | WHITE | | 205 | Stock |
| [Edit] [Delete] | S0623 | 2000 | Oldsmobile | Intrigue | FROST WHITE | | 205 | Stock |
| [Edit] [Delete] | T0591 | 2000 | Chevrolet | C/K 3500 | | | 205 | Stock |
| [Edit] [Delete] | bm2006 | 1996 | Jeep | Wrangler | | | 205 | Stock |
| [Edit] [Delete] | BM2000 | 2000 | Chevrolet | Camaro | | | 205 | Stock |

VIEWING PAGE 1 OF 130   GO TO PAGE [2]

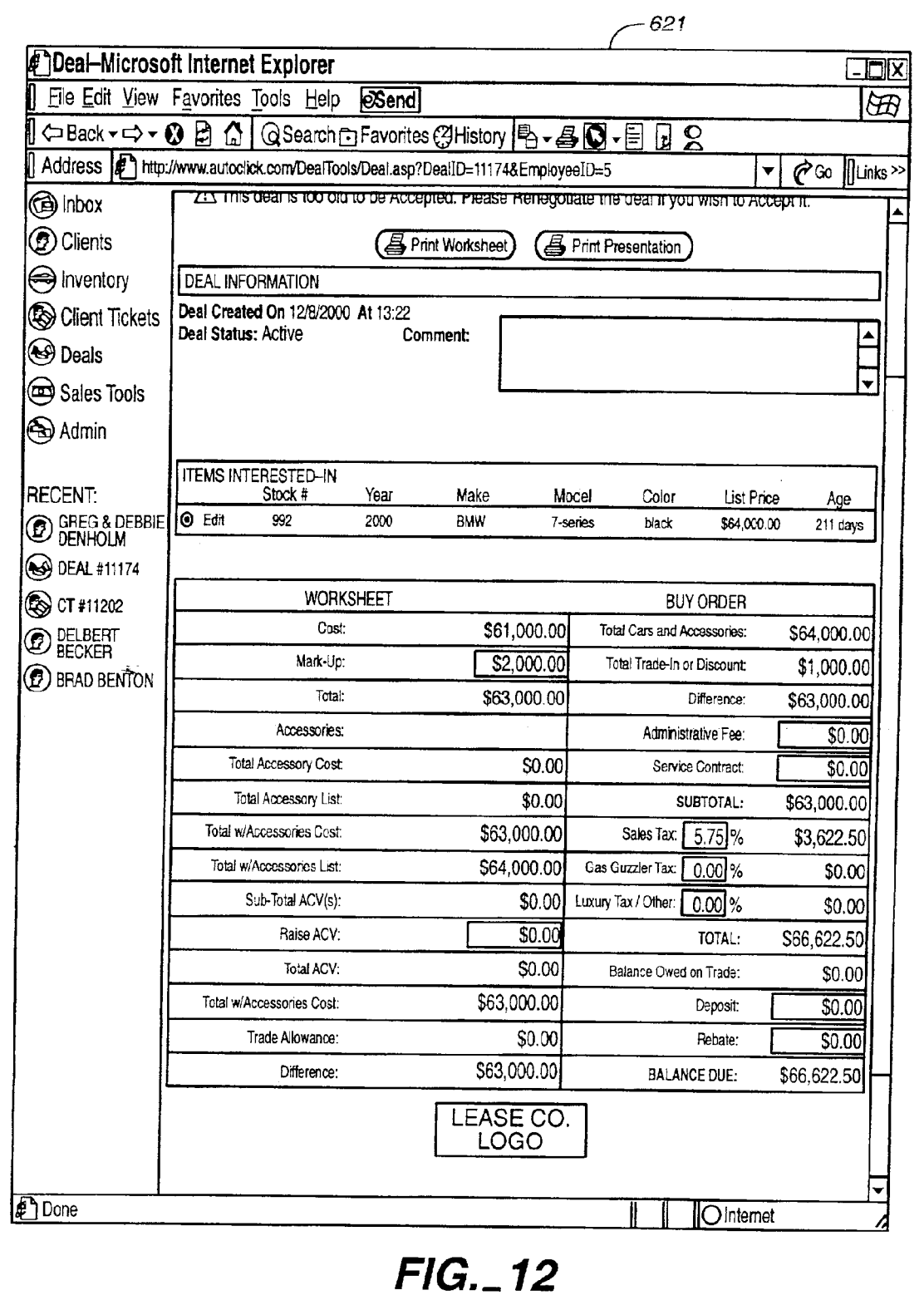

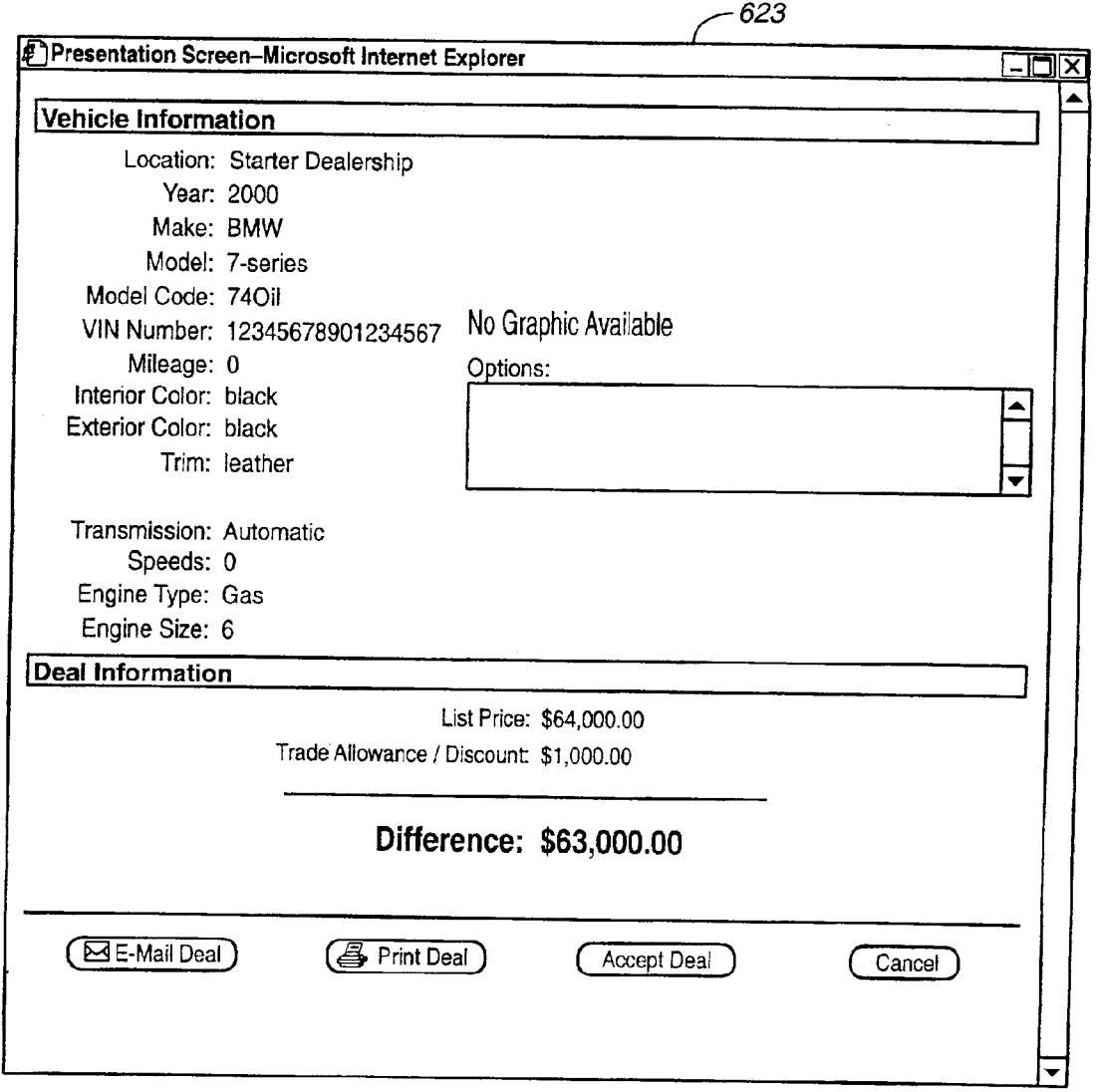
FIG._13

*631*

Finalize Deal—Microsoft Internet Explorer

FINALIZE THE DEAL – Cancel

FINANCING INFORMATION FOR SOLD VEHICLE [1992]

Financing: Lease ▼   Term: 36 Months

Rate: 0 %   Residual: 0 %   Payment: $0.00

Replacement Date: [ ]

DISTRIBUTE ACV DISCOUNT:

| Total ACV Discount to Distribute: | $0.00 |
|---|---|
| Remaining to Distribute: | $0.00 |

( Finalize Deal )

Note: To finalize the deal, edit the list prices for the trade-ins and complete the financing information about the item that is being sold. Then if you have any Additional ACV to distribute, make sure to distribute it to the appropriate trades and then click the FINALIZE DEAL Button.

FIG._14

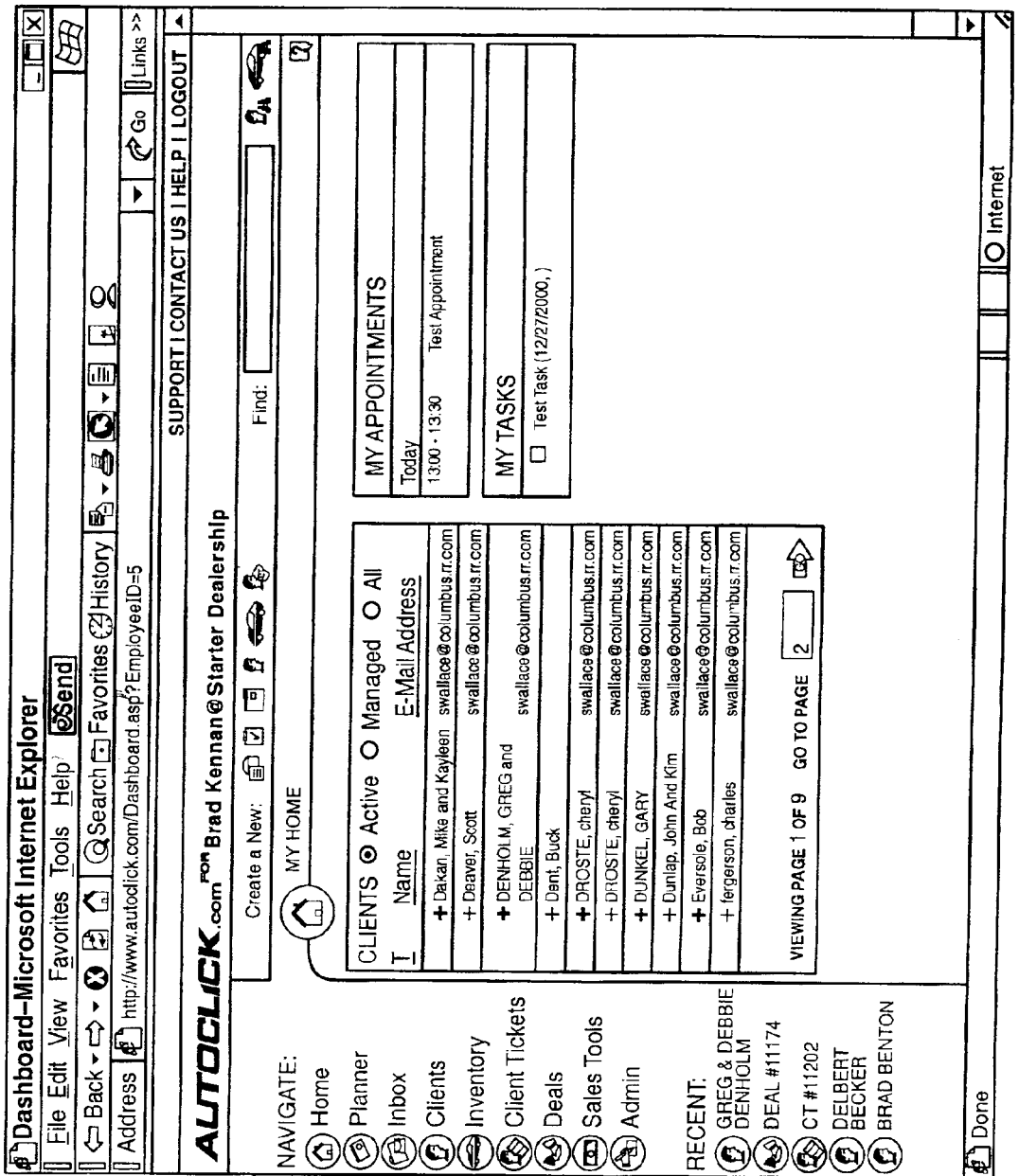
FIG._15

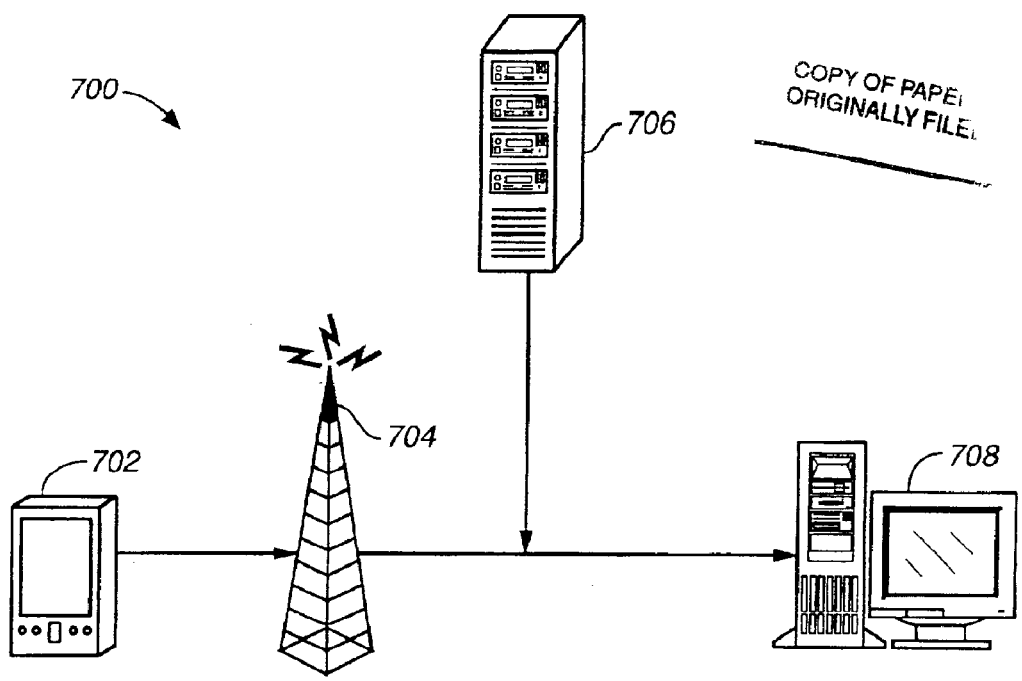
FIG._16
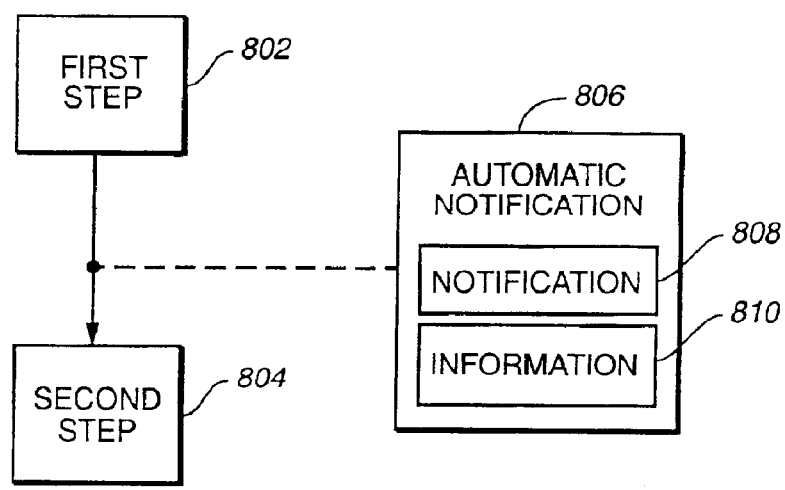
FIG._17

CUSTOMER MANAGEMENT SYSTEM FOR AUTOMOBILE SALES INDUSTRY

The present application is based on and claims the benefit of U.S. provisional patent application Serial No. 60/263,019, filed Jan. 19, 2001, the content of which is hereby incorporated by reference in its entirety.

BACKGROUND OF THE INVENTION

The present invention relates generally to a customer management system. More particularly, the present invention relates to a customer management system particularly well suited for application within a sales-related industry, such as the automobile sales industry.

Attempts have been made to design a system, such as a software system, that effectively manages interactions with customers of a single seller organization or multiple seller organizations within a sales-related industry. Attempts have also been made to design a system, such as a software system, that improves the efficiency and accuracy of the collection of customer interaction data by a single seller organization or multiple seller organizations within a sales-related industry. Generally speaking, those attempts have generated systems wherein the decision of whether to make a record of specific customer interactions is broadly subjective in nature and largely dependent on the judgment of a human being, such as a seller's employee. Within those systems, in instances when the decision is made to record an occurrence of customer interaction, the decision as to exactly what information should be recorded is also broadly subjective in nature. Accordingly, many of the customer management systems available to seller organizations within sales-related industries produce inconsistent data. Accordingly, information that can be gleaned from that data (e.g., information obtained based on data analysis) will be tainted with inconsistency.

A seller's manager who accesses statistics derived based on inconsistent records of customer interaction has no way to know how complete or accurate the statistics might be. Without generally uniform treatment and processing of multiple types of customer interactions, significant customer interactions are inaccurately reflected in the statistics. In fact, there are many reasons why some significant customer contacts are not reflected in the statistics at all. For example, some customer interactions get lost because the customer interaction with the seller was through an undocumented Internet contact, because the customer contacts the seller by filling out a survey that is filed away and forgotten, or because the customer interacts with numerous employees of the seller including one or more who make no record of the customer contact. Seller-customer interactions get lost for all of these and other reasons.

Inconsistent and/or incomplete customer interaction information can detrimentally affect the employee's decision making process or strategy implementation. For example, an employee of a seller organization who accesses information pertaining to a particular customer's interactions with the seller may be presented with generally inconsistent and potentially incomplete information. Decisions and/or strategies based on inconsistent and/or incomplete information are susceptible to inaccuracy.

For these reasons and others, systems that do not provide a generally standard format for documenting different types of customer interactions and/or systems that place unnecessarily high reliance on the diligence of individual employees to keep records of customer interactions can be problematic.

Many employees have little motivation or incentive to keep detailed records for their employer. A system that requires too much of an employee's time and energy, however, can also be problematic in that the employee is forced to expend time and energy that can otherwise be devoted to following up on sales contacts and completing sales.

The present invention addresses at least one of these and other problems and offers advantages over the prior art.

SUMMARY OF THE INVENTION

One aspect of the present invention pertains to a computer-implemented method of collecting client contact data is provided. The method includes the steps of opening a client ticket session to create a client ticket, supplying the client ticket with information, and closing the client ticket session after a predetermined time. Once the client ticket session is closed further alteration of the client ticket is precluded.

Another aspect of the present invention pertains to a computer readable data storage device storing computer implementable steps, which, when executed cause a computer to open, in response to a user input, a client ticket session, thereby triggering creation of a client ticket. The steps, when executed, also cause a computer to display a screen prompting the user to associate the client ticket to a client, to display a screen prompting the user to associate a product to the client ticket, and to close the client ticket session after a predetermined time. Once the client ticket session is closed, further alteration of the client ticket is precluded.

Yet another aspect of the present invention pertains to a computer-implemented method of recording and tracking interactions between an automobile sales organization and one of its customers. The method includes a step of obtaining a qualified client contact which is characterized by an interaction between the automobile sales organization and the customer that can reasonably be construed as a sale opportunity. The method also includes the steps of opening a client ticket session to create a client ticket, supplying the client ticket with information pertaining to the qualified client contact, and closing the client ticket session after a predetermined time. Once the client ticket session is closed, further alteration of the client ticket is precluded.

Other features and benefits that characterize embodiments of the present invention will be apparent upon a reading of the following detailed description and review of the associated drawings.

BRIEF DESCRIPTION OF THE DRAWINGS

FIGS. 7–15 are sample screen shots associated with a software system.

FIG. 16 is a schematic diagram of a particular client-seller interaction system.

FIG. 17 is a schematic diagram of an automatic notification method associated with a software system.

DETAILED DESCRIPTION OF ILLUSTRATIVE EMBODIMENTS

1. Exemplary Operating Environments

While the present description will be formulated in the general context of a customer management system for use within the automobile sales industry, embodiments of the present invention can just as easily be applied in other contexts. For example, embodiments can be applied within any sales environment, particularly those that operate in a manner that is similar to the automobile sales industry. Example alternate sales environments within which embodiments of the present invention can be applied include but are not limited to those involving the sale of boats, campers, real estate, mobile homes, motorcycles, furniture and farm equipment.

Figure 1:
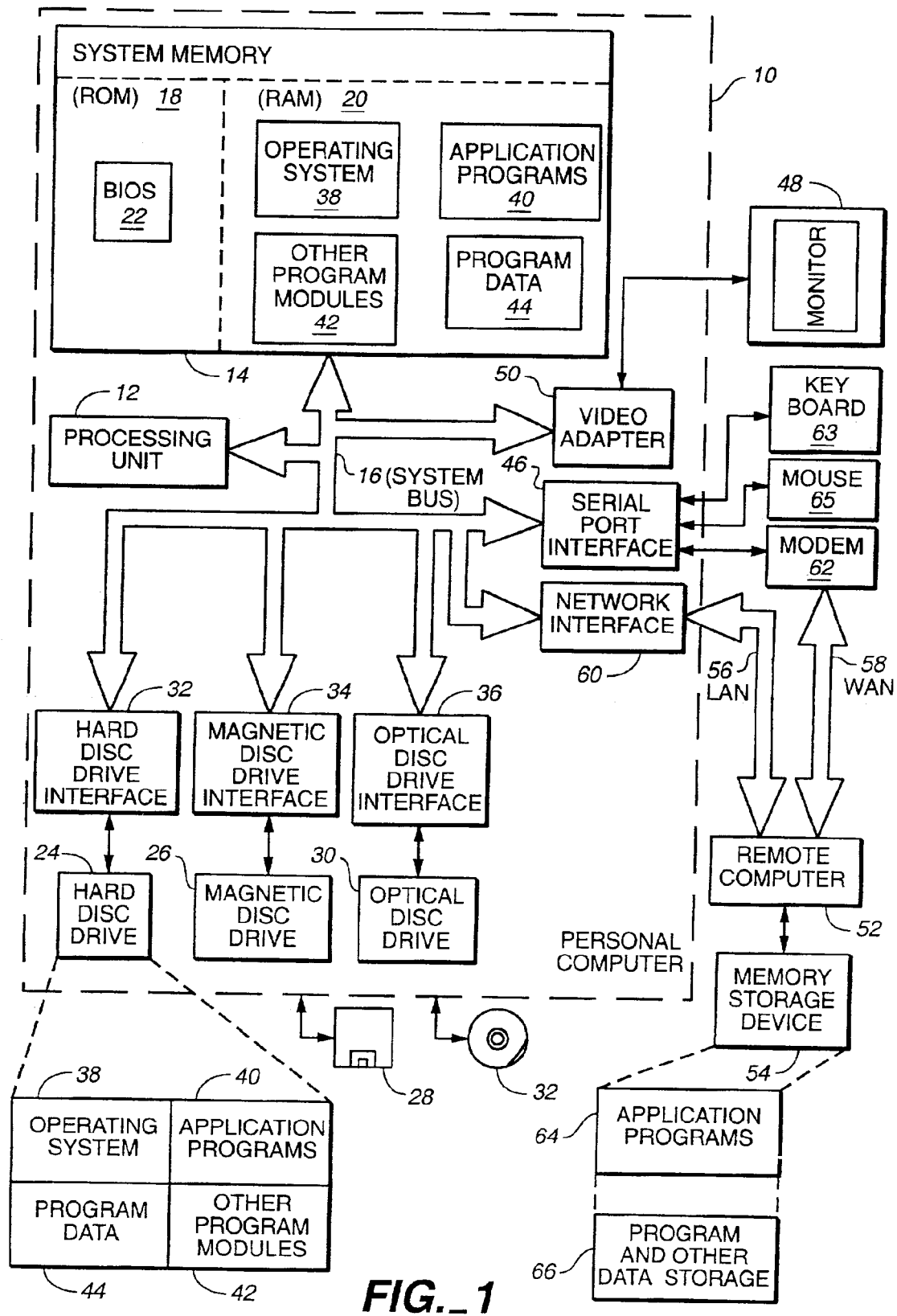
FIG. 1 is a block diagram of an exemplary computer system within which embodiments of the present invention can be implemented.

Embodiments of the present invention may illustratively be applied in the context of a computer system. FIG. 1 is a block diagram of an exemplary computer system within which embodiments of the present invention can be implemented. The system includes a conventional personal computer 10, including a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the personal computer 10, is stored in ROM 18.

Embodiments of the present invention can be applied in the context of computer systems other than the FIG. 1 personal computer 10. Other appropriate computer systems include handheld devices, multiprocessor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Personal computer 10 further includes a hard disc drive 24, a magnetic disc drive 26, and an optical disc drive 30. Magnetic disc drive 26 can illustratively be utilized to read from or to write to a removable disc 28. Optical disc drive 30 can illustratively be utilized for reading data from (or writing data to) optical media, such as a CD-ROM disc 32. The hard disc drive 24, magnetic disc drive 26 and optical disc drive 30 are connected to the system bus 16 by a hard disc drive interface 32, a magnetic disc drive interface 34, and an optical disc drive interface 36, respectively. The drives and their associated computer-readable media provide nonvolatile storage for the personal computer 10. Other types of media that are readable by a computer may also be used in the exemplary operation environment.

A number of program modules may be stored in the drives and RAM 20, including an operating system 38, one or more application programs 40, other program modules 42 and program data 44. In particular, one of the other programs modules 42 can illustratively be an automobile sales industry system that demonstrates certain features and embodiments of the present invention, which are described below with reference to other Figures.

Input devices including a keyboard 63 and a mouse 65 are operably connected to system bus 16 through a serial port interface 46 that is coupled to system bus 16. Input devices could be connected utilizing other interfaces such as a universal serial bus (USB). Monitor 48 is connected to the system bus 16 through a video adapter 50. Other peripheral output devices (e.g., speakers or printers) could also be included but have not been illustrated.

The personal computer 10 may operate in a network environment utilizing connections to one or more remote computers, such as a remote computer 52. The remote computer 52 may be a server, a router, a peer device, or other common network node. Remote computer 52 may include many or all of the features and elements described in relation to personal computer 10, although only a memory storage device 54 has been illustrated in FIG. 1. The network connections depicted in FIG. 1 include a local area network (LAN) 56 and a wide area network (WAN) 58. Such network environments are commonplace in the art.

The personal computer 10 is connected to the LAN 56 through a network interface 60. The personal computer 10 is also connected to WAN 58 and includes a modem 62 for establishing communications over the WAN 58. The modem 62, which may be internal or external, is connected to the system bus 16 via the serial port interface 46.

In a networked environment, program modules depicted relative to the personal computer 10, or portions thereof, may be stored in the remote memory storage device 54. For example, application programs 64 may be stored utilizing memory storage device 54 and may include an automobile sales industry system that demonstrates certain features and embodiments of the present invention, as described below in relation to other Figures. In addition, data associated with an application program, such as an automobile sales industry system demonstrating certain features and embodiments of the present invention, may illustratively be stored within data storage 66, which is associated with memory storage device 54 (alternatively, or in combination, the data may be stored within one of the data storage locations associated with computer 10). It will be appreciated that the network connections shown in FIG. 1 are exemplary and other means for establishing a communications link between the computers, such as a wireless interface communications link, may be used.

Notwithstanding the broad applicability of the principles of the invention described above, it should be understood that the configuration of the exemplary embodiment as an application program that is stored on, and enables data to be stored on, a remote computer such as remote computer 52 provides significant advantages. For example, such a configuration minimizes the functional requirements (e.g., storage capacity) of personal computer(s) 10 and enables a broader range of potential adaptive control features, simplified system updating and upgrading features, and simplified debugging and trouble shooting features.

2. Accessing Information—First Embodiment

A.) System 100

Figure 2:
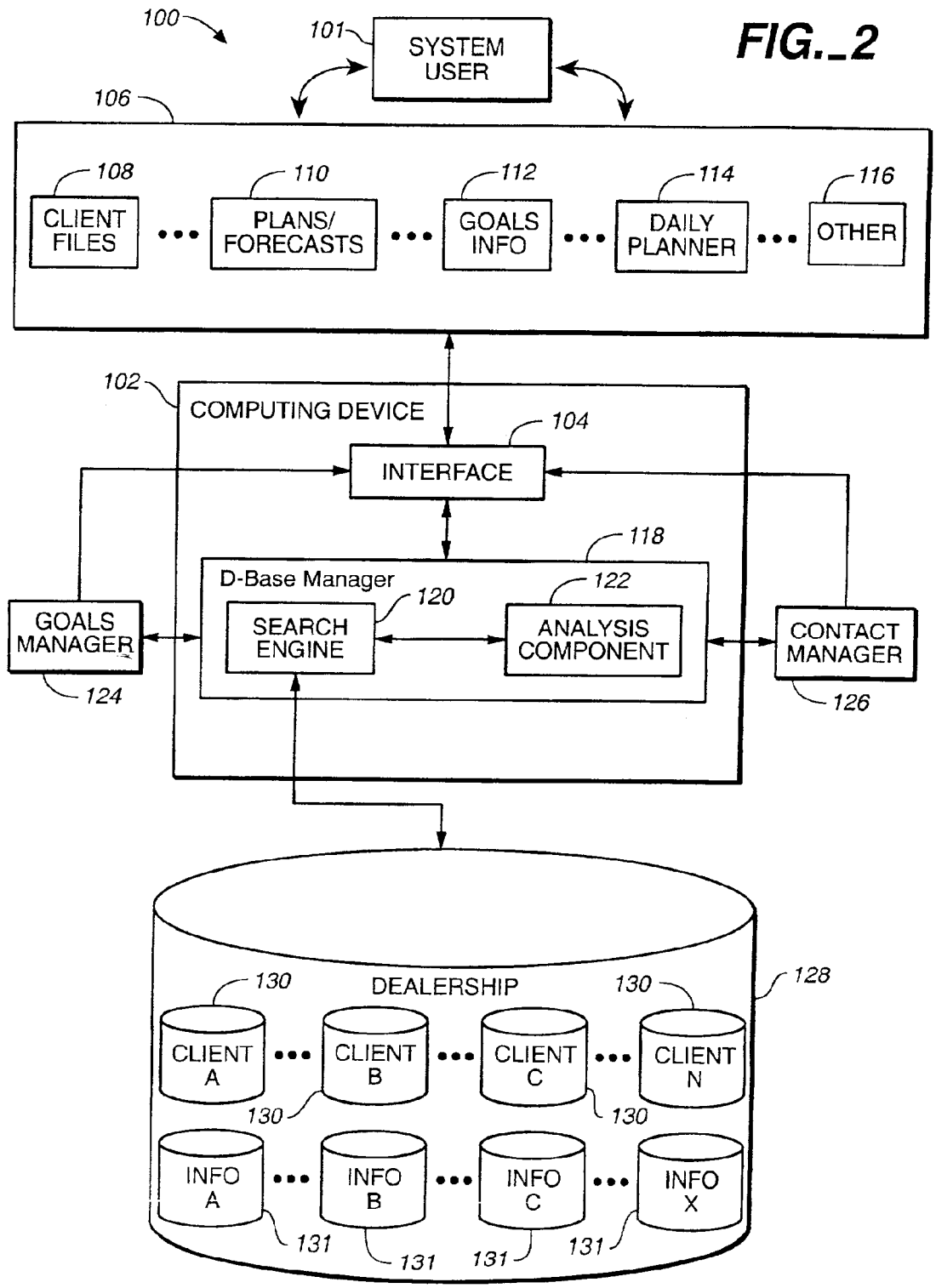
FIG. 2 is a block diagram of an information access system.

FIG. 2 is a block diagram of an information access system 100 in accordance with one aspect of the present invention. System 100 is configured such that a system user 101 interacts with a computing device 102 in order to access information.

System user 101 is illustratively an individual that is internally aligned with a sales-oriented organization. For example, user 101 may be an employee, manager or owner of an automobile dealership. Accordingly, the information accessed from device 102 may pertain to internal client management or other dealership-related matters. User 101 is able to interact with computing device 102 and access information by utilizing an interface 104. Interface 104 is configured to receive input from user 101 in the form of instructions, queries, commands, and the like. Interface 104 is further configured to display, print, transmit electronic mail (e-mail) or otherwise supply information to user 101 either automatically or in direct response to input(s) made by user 101.

Box 106 contains exemplary types of information that may be accessed by user 101 through interface 104. The exemplary types of information include client files 108, plans/forecasts 110, goals information 112 and daily planner information 114. As is indicated by block 116, other types of information should be considered within the scope of the present invention.

Computing device 102 may include, although it need not necessarily include, some or all of the features and elements described in relation to personal computer 10 in FIG. 1. Computing device 102 can be a handheld computing device, a multi-processor computing device, a microprocessor-based or programmable consumer electronic computer device, a mini-computer device, a mainframe computer device or some other computing device.

Computing device 102 illustratively includes a database manager 118 that includes a search engine 120 and an analysis component 122. While database manager 118 has been illustrated as being internally located within computer device 102 (e.g., accessibly stored within an internal storage location), database manager 118 may alternatively be accessibly stored on an independent, remotely connected computing device. In accordance with the latter embodiment, computing device 102, utilizing a conventional network connection such as but not limited to those described above in relation to FIG. 1, is able to remotely access and utilize database manager 118 and its components.

Not all of the components of database manager 118 need be stored in the same location or on the same computing device. For example, search engine 120 can be remotely stored, accessed and operated while analysis component 122 is locally stored, accessed and operated from a location within computing device 102 (or vice versa). In addition, any sub-components of search engine 120 and/or analysis component 122 can similarly be stored within a single computing device or within multiple computing devices capable of communicating with one another.

Search engine 120 is communicatively associated within a database 128. Dealership database 128 is illustrated as being externally located from computing device 102. For example, dealership database 128 may be accessibly located on an independent, remotely connected computing device that is connected to computing device 102 utilizing a typical connection such as, but not limited to, the remote connections described in relation to FIG. 1. Dealership database 128 may alternatively be internally located within computing device 102 and communicatively connected to search engine 120 therein.

Database 128 contains a plurality of sub-databases 130 and 131. Database 128 is illustratively a large database associated with a sales-oriented organization such as a dealership in the business of selling automobiles, and will be referred to hereafter for exemplary purposes as dealership database 128. Each one of the multiple sub-databases 130 illustratively contains information pertaining to one of the dealership's clients (client sub-databases 130).

For the sake of the present example, assume that dealership has a plurality of clients, namely client A through client N. As is illustrated, dealership database 128 thus contains a plurality of client sub-databases 130 labeled client A through client N. There need not necessarily, however, be as many client sub-databases 130 as the dealership has clients.

Each one of the sub-databases 131 (A–X) contains various other information pertaining to the administration of the dealership. Sub-databases 131 may be larger or smaller than client sub-databases 130 and there need not necessarily be as many sub-databases 131 as client databases 130. In accordance with one embodiment, at least one of the sub-databases 131 contains a listing of the dealership's inventory (e.g., automobiles available for sale, automobile service parts available, etc.).

In accordance with another embodiment, client sub-databases may share client information with at least one of the sub-databases 131. In other words, each client sub-database 130 is not necessarily an exclusive collection of all information pertaining to a given client. Other information pertaining to the same client may be stored in sub-databases 131. The content of client sub-databases 130 will be described below in greater detail in relation to FIG. 6. Utilizing its remote connection to dealership database 128, search engine 120 is able to access and interact with dealership database 128, and therefore with client sub-databases 130 and sub-databases 131.

In most instances, the information to which user 101 is given access is either directly obtained or directly derived from information retrieved from dealership database 128. If user 101 desires to access certain specific pieces of information, he or she interacts with computing device 102 through interface 104 and thereby utilizes search engine 120 to retrieve the piece or pieces of information from dealership database 128. For example, user 101 can retrieve client B's address in this manner. The information is returned to user 101 via interface 104.

B.) Client Files 108

If user 101 desires to access a client file 108 for a particular client, he or she may interact with computing device 102 through interface 104 to request the desired client file 108. Upon receipt of the request, computer device 102 utilizes database manager 118 to retrieve the information from dealership database 128 that is to be included in the requested client's client file 108. The client file information is formatted and provided to user 101 through interface 104.

Client files 108 are conveniently organized collections of information pertaining to individual clients. The general content of client files 108 is modifiable and can be varied by adjusting various system parameters. Specific examples of client file content will be discussed below in relation to other Figures. Some of the content of a client file 108 may come from client sub-databases 130 and some of the content may come from sub-databases 131. Of course, an individual client file 108 may not necessarily include all of the information contained within the associated client sub-database 130.

Some of the information retrieved from dealership database 128 and incorporated into a client file 108 may not pertain directly to sales activity, but rather might be an entirely different class or type of information. For example, a client file 108 can include information pertaining to automobile service or maintenance that the client has had performed at the dealership. Other information besides sales and service information may be stored within dealership database 128 and can be incorporated into a client file 108.

In accordance with one embodiment, information associated with goals information 112, plans/forecasts 110 and/or daily planner 114 (all described in more detail below) may be incorporated into a client file 108. Other information derived from (rather than being simply retrieved from) information stored in dealership database 128 can be incorporated into a client file 108 as well.

In accordance with another embodiment, client files 108 are automatically generated and are independently stored within dealership database 128 (e.g., stored within one or more sub-databases 131), where they can be quickly retrieved, manipulated and updated. In the context of this embodiment, user 101 requests a client file 108, and then that client file 108 is retrieved from database 128 and returned to user 101 through interface 104.

Client files 108 can be interactive and enable user 101 to do subsequent information requests and retrievals. For example, user 101 may receive a client file 108 that includes a list of client contact events that the client has initiated with the dealership. User 101 may simply select (e.g., utilizing an input device) one of the listed initiated client contact events. That selection illustratively communicates a request to interface 104 and causes search engine 120 to retrieve information pertaining to the selected client contact event (e.g., contact method, contact activities, weather outside, vehicle or product interest, etc.) from database 128. That information is returned to user 101 via interface 104. The information returned to user 101 can then lead to similar subsequent information requests. For example, user 101 can select an item (e.g., a particular vehicle the client expressed interest in) from the client contact information and retrieve information specific to the item (e.g., the vehicle's price, photo, sold status, etc.). This manner of information retrieval can be generally applied in contexts other than the context of a client file 108.

C.) Plans/Forecasts 110

User 101 may access information in the form of a plan/forecast 110. A plan 110 is a computer-generated recommendation as to what steps should be taken (e.g., what type of client interaction should be initiated) in order to increase the odds or likelihood that a particular client might purchase an item (e.g., a vehicle). A forecast 110 is simply a computer-generated opinion as to the likelihood that a particular client might actually purchase an item. In order to facilitate creation of plans/forecasts 110, analysis component 122 is illustratively preprogrammed or otherwise configured to apply parameters to enable predictions to be made based on statistics or patterns demonstrated within the data contained in dealership database 128.

As will be described in greater detail in relation to FIG. 6, client sub-databases 130 include records of client-dealership interactions that precede and follow both successful and unsuccessful sales opportunities. In accordance with one embodiment, analysis component 122 defines a successful outcome as the sale of a vehicle. Analysis component 122 then utilizes search engine 120 to search through dealership database 128 (e.g., through client sub-databases 130) for patterns of events or repeated characteristics that are associated with successful and unsuccessful outcomes. Based on that information, analysis component 122 is able to create a plan 110 or forecast 110. User 101 is given access to the plan/forecast through interface 104. Illustratively, user 101 may utilize the plan/forecast 110 to assess a similar sales situation or to facilitate an attempt to encourage successful outcomes in the future with different clients.

Plans/forecasts 110 can be generated in response to specific queries initiated by user 101 through interface 104. For example, user 101 may query what action should be taken after a client e-mails the dealership expressing interest in a vehicle. In response to the query, analysis component 122 may analyze data within dealership database 128 and find that a commonly repeated series of events that leads to a sale is when a salesperson calls a client on the phone within two days after the client sends an e-mail. User 101 is then illustratively given access to the analysis results via interface 104.

In accordance with another embodiment, user 101 may generally query as to what sequences of events have proven to be generally successful. In response to the query, analysis component 122 analyzes data and finds a number of event sequences that have commonly preceded a successful outcome. User 101 is then illustratively given access to the analysis results via interface 104.

Plans/forecasts 110 may be more complex than simple event sequences. Analysis component 122 can be configured such that some event sequences are more effective depending on certain correlated circumstances. For example, it may be found that some event sequences are more successful in the winter than in the summer, or when a test drive was conducted rather than when it wasn't, or when the client is a woman rather than a man, or when the salesperson is a woman rather than a man, etc. Illustratively, system 100 is programmed or otherwise configured to identify characteristics and circumstances that frequently correlate with particular outcomes. Some of the identified correlations may be accurate and others may not. However, accuracy will presumably increase as the amount of data in dealership database 128 increases. The system illustratively analyzes data under the assumption that the more frequently a characteristic or circumstance presents itself, the more likely it will again be repeated.

Illustratively, system 100 is programmed or otherwise configured to allow a system user to enter in or otherwise set environmental rules that are utilized during the generation of plans/forecasts 110. For example, the system user can configure system 100 to collect and utilize certain particular types of data so as to enable customized generation of plans/forecasts 110. For example, the system user could configure system 100 to collect data that pertains to the age of purchasers and to account for the age data in the generation of plans/forecasts 110. Other types of data could also be collected and accounted for depending on the system user's preferences.

The nature and accuracy of plans/forecasts 110 are dependent upon the type and amount of data contained within dealership database 128. Plans/forecasts 110 can be enhanced and tailored by enabling the tracking and storing of any of a wide variety of types of information within dealership database 128. Also, analysis component 122 must be programmed to recognize each data type and to include it within its analytical processes.

D.) Goals Info 112 and Daily Planner 114

In order for user 101 to access some of the information types listed in box 106, system interaction with goals manager 124 and/or contact manager 126 may be required. In accordance with one embodiment, goals manager 124 and contact manager 126 are application programs that generally executed by a computer processor.

The typical sales process is naturally inclined to the establishment of goals. For example, relevant goals might be selling a certain number of units, seeing a certain number of clients or averaging a certain amount of gross profit. Goals manager 124 provides system 100 with the ability to allow user 101 (or some other system user) to customize and track various goals.

User 101 interacts with goals manager 124 through interface 104 to create, store and monitor goals for the dealership's sales people or for the entire dealership or otherwise. After being set, the goals are either stored within goals manager 124 or accessibly stored elsewhere. User 101 is able to interact with computing device 102 through interface 104 to periodically access goals information 112 and monitor progress towards achieving goals.

Assuming the user is authorized to do so, user 101 may interact with goals manager 124 through interface 104 to change or adjust goals when necessary. Authorization verification may be required by system 100 to set, change, review and/or adjust goals. For example, user 101 may have to correctly input a password or otherwise authenticate himself or herself in order to set, change, review and/or adjust goals.

In order to compile, derive and track goals information, goals manager 124 interacts with database manager 118. As necessary, search engine 120 may retrieve data from database 128 to accommodate goals manager 124 during the creation and tracking of goals information. Similarly, analysis component 122 can process data to accommodate goals manager 124 during the creation and tracking of goals information. The goals information is illustratively subsequently formatted into a specialized format and transferred to interface 104, where user 101 is able to access it (e.g., as part of goals information 112).

The goals that can be set and tracked by goals manager 124 may be directly related to information stored within dealership database 128. Goals manager 124 interacts with database manager 118 to retrieve and process data from database 128 in order to compute the progress of goal achievement. If an authorized system operator (e.g., user 101) desires to set a new type of goal, corresponding information is periodically stored in dealership database 128. In addition, goals manager 124 is configured to utilize database manager 118 to retrieve data that is relevant to the new type of goal. Goals manager 124 and database manager 118 are also configured to compute and monitor the new goal type.

Contact manager 126 operates somewhat differently than goals manager 124. Generally speaking, contact manager 126 interacts with database manager 118 in order to compile and derive information that is subsequently formatted and transferred to interface 104 for access by user 101 as part of daily planner 114 (note, daily planner 114 could alternatively be a monthly planner, a yearly planner, etc.). Contact manager 126 utilizes search engine 120 to retrieve information from dealership database 128 that pertains to a historical listing of interactions between the dealership and a particular client or clients (retrieval could be a historical listing of information relating to multiple clients). The historical listing of interactions may then be analyzed to determine whether it would be advisable (e.g., whether it would increase the odds of completing a sale) for someone from the dealership to presently initiate another client contact. In accordance with one embodiment, the rules or other devices/methods of calculating the odds that a sale will be completed can be manipulated or tailored by a system user (i.e., by an employee of the dealership or other relevant sales organization).

Once the determination has been made that a present contact should be initiated, corresponding formatted information is transferred to interface 104 within daily planner 114. In effect, when a system operator (e.g., user 101) views daily planner 114, he or she will see that his or her schedule (or to-do list) includes initiating a particular client contact with a particular client (e.g., a phone call is scheduled to be made to a particular client).

The determination to initiate a present client contact can be based either on a predetermined system rule (e.g., no client should go longer than 6 months without contact from the dealership) or based on patterns or statistics recognized in the historical listings of interactions (e.g., contact history) of other clients. Illustratively, assuming the user has authority to do so, user 101 or some other user may interact with interface 104 to adjust the predetermined system rules (a.k.a., client contact rules).

Some client contact rules can apply specifically to active clients (those who may purchase soon) and other rules may apply specifically to managed clients (those who might not buy soon). Information is illustratively stored within client sub-databases 130 to identify whether an associated client has an active or managed status. In accordance with one embodiment, user 101 is able to retrieve, through interface 104, a list of active and/or managed clients. Illustratively, the list can be specific to one particular salesperson or to an entire sales organization.

Analysis component 122 can also aid contact manager 126 in making determinations as to when present client contacts should be initiated. As was described above in relation to plans/forecasts 110, analysis component 122 is configured to analyze data contained within dealership database 128 and to generate a recommended procedure as to what steps should be taken (e.g., what type of client interaction should be initiated) in order to increase the odds or likelihood that a particular client might purchase an item.

In accordance with one embodiment, historical lists of client interactions related to multiple individual clients contained within dealership database 128 are automatically analyzed by analysis component 122 to determine whether and when a contact should be initiated (initiated immediately or in the future) to encourage a sale presently or in the future. When a determination is made that a contact should be initiated, contact manager 126 supplies information to interface 104 within daily planner 114 so as to schedule the suggested contact initiation for a particular individual (e.g., user 101).

In accordance with one embodiment, contact manager 126 is configured to monitor whether assigned tasks have been completed and to reassign the tasks to the daily planner 114 of others if the task is not timely carried out. If a system operator disagrees with the computer's analysis, means may be provided to disregard the computer's suggestion without falsely recording the task as having been carried out. Disregarding the computer's suggestion may illustratively require a certain level of authority and system verification (e.g., correct entry of a password). Information as to completed client contacts is illustratively stored within dealership database 128 and is available for analysis by analysis component 122.

In some instances, a suggested client contact may include a suggestion as to a particular type of client contact to be initiated (e.g., if patterns show that a phone call is an advisable next step rather than sending e-mail). In other instances, the result of such analysis may be a general suggestion that some contact, regardless of its type, be made.

In some instances, the particular nature of the suggested client contact may require a decision (e.g., a client hasn't been contacted for 6 months and daily planner 114 schedule shows that "some" contact should be initiated). The information supplied within daily planner 114 may include a list of suggested possible contact options (e.g., send e-mail, send flowers, gift box, send standardized letter, etc.). The list may illustratively include an indication of contact options that have already previously been utilized to contact a particular client, so that a system operator may avoid repetitive use of the same contact option with the same client.

In accordance with one embodiment, items within the list of contact options are directly connected to electronic means for achieving the option, in response to user direction or automatically without user direction. For example, choosing "send e-mail" from the list triggers system 100 to cause an e-mail to automatically be sent to the client. Similarly, flowers, gifts, letters, etc. are illustratively ordered, retrieved and/or sent automatically upon being selected from the list utilizing an interface 104 input mechanism.

In accordance with one embodiment, contact manager 126 is able to utilize database manager 118 to review client sub-databases 130 so as to recognize any indications of particular items that a specific client is interested in purchasing. If an item that fits the client's interest becomes available (e.g., items are added to inventory) then contact manager 126 notifies a system operator (e.g., notifies user 101 through interface 104) that an available product matches a client's interest. In accordance with one embodiment, contact manager 126 is able to utilize database manager 118 to review the inventory of multiple sellers so as to allow, for example, a first seller to locate a car for a client of the first seller from the inventory of a second seller. In other words, contact manager 126 is configured to enable cross-selling of items.

Goals manager 124 and contact manager 126 are illustrated as being externally located from computing device 102. Goals manager 124 and/or contact manager 126 may be accessibly located or accessibly stored on an independent, remotely connected computing device. The remotely connected computing device is connected to computing device 102 utilizing a typical network connection such as (but not limited to) the remote connections described in relation to FIG. 1.

In accordance with one embodiment, goals manager 124 and contact manager 126 are each individually stored on separate, independent, remote computing devices that are each operably connected to computing device 102. Utilizing a remote connection, goals manager 124 and/or contact manager 126 are able to remotely access and interact with database manager 118 and its components. Alternatively, goals manager 124 and/or contact manager 126 may be internally stored and operated from a location within computing device 102. Or, goals manager 124 and/or contact manager 126 may be stored and operated from a location within database manager 118.

As was stated above, analysis component 122 can be configured such that some event sequences are more effective depending on certain correlated circumstances. For example, it may be found that some event sequences are more successful depending on the weather, the client's sex, occurrence of a test drive, etc. Illustratively, system 100 is programmed or otherwise configured to identify characteristics and circumstances that frequently correlate with particular outcomes and to reflect or account for such characteristics and circumstances in goals information 112 and in daily planner 114 information. Some of the identified correlations and characteristics may be accurate and others may not. However, accuracy will presumably increase as the amount of data in dealership database 128 increases. The system illustratively analyzes data under the assumption that the more frequently a characteristic or circumstance presents itself, the more likely it will again be repeated.

Illustratively, system 100 is programmed or otherwise configured to allow a system user to enter in or otherwise set environmental rules that are utilized during the generation of goals information 112 and daily planner 114 information. Therefore, the system user can configure system 100 to collect and utilize certain particular types of data so as to enable customized generation of goals information 112 and daily planner 114 information. For example, the system user could configure system 100 to collect data that pertains to the age of purchasers and to account for the age data in the generation of goals information 112 and daily planner 114 information. Other types of data could also be collected and utilized depending on a system user's preferences.

3. Accessing Information—Second Embodiment

A.) System 300

Figure 3:
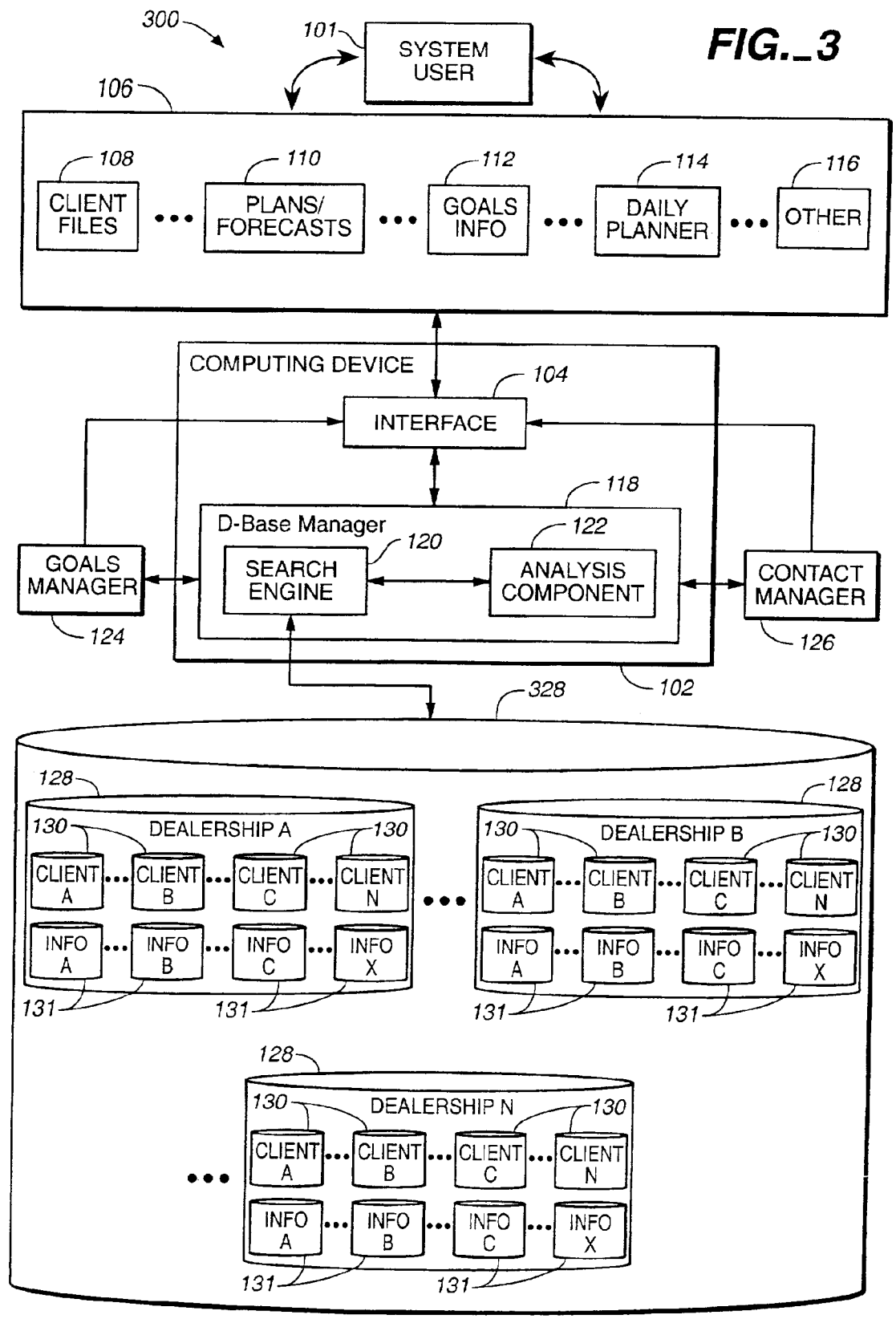
FIG. 3 is a block diagram of another information access system.

FIG. 3 is a block diagram of an information access system 300 in accordance with another aspect of the present invention. The same reference numerals are used in FIG. 3 for elements that are the same or similar to those elements illustrated and described in relation to FIG. 2.

System 300 operates in a manner that is significantly similar to the operation of system 100 described above with reference to FIG. 2. There are, however, significant differences between the two systems. Within system 100, computing device 102 illustratively interacts with a dealership database 128 that contains data pertaining to a single organization, such as a single automobile dealership. Within system 300, however, computing device 102 interacts with a much more comprehensive database, namely combination database 328.

Combination database 328 contains multiple dealership databases 128, illustratively labeled dealership A through dealership N. In accordance with one embodiment, each dealership database 128 corresponds to, and contains data related to, an individual organization, such as an individual automobile dealership. Illustratively, hundreds or more dealership databases 128 can be contained within combination database 328. Each individual dealership database 128 contains client sub-databases 130 and sub-databases 131 as described above in relation to system 100 (FIG. 2).

Combination database 328 is illustrated as a single database externally located from computing device 102. For example, dealership database 328 may be accessibly located on an independent, remotely connected computing device. The remotely connected computing device may then be connected to computing device 102 utilizing a typical connection such as, but not limited to, the remote connections described in relation to FIG. 1. In accordance with a different embodiment, combination database 328 is internally located within computing device 102 and operably connected to search engine 120 therein. Regardless of the nature of connection between computing device 102 and database 328, search engine 120 is illustratively configured to access information from combination database 328, and therefore from dealership databases 128, and therefore from any of the sub-databases 130 and 131.

It is conceivable that at least one dealership database 128 might not be contained within combination database 328 but instead be independently connected to database manager 118. Such a dealership database, for example, might be remotely maintained on a computing device that is independent from the computing device on which combination database 328 is stored and maintained. In accordance with one embodiment, database manager 118 is able to operably communicate with all connected dealership databases 128 regardless of whether they are stored in the same location or on the same device. A plurality of dealership databases 128 can all individually be operably connected to database manager 118 and be utilized in place of combination database 328. Regardless of the precise storage configuration, database manager 118 is capable of interacting with multiple dealership databases 128 to perform functions similar to those described in relation to system 100 (FIG. 2) but on a larger scale with access to a larger amount of data.

System 300 is configured such that user 101 is able to interact with computing device 102 (through interface 104) to access information such as the exemplary types of information illustrated in box 106. The type of information to which user 101 is given access is illustratively similar in the context of both systems 100 and 300. In the context of system 300, however, a much larger amount of information may potentially be accessed and/or be analyzed.

B.) Client Files 108

In the context of client files 108, access to multiple dealership databases 128 is beneficial for a variety of reasons. As was stated in relation to FIG. 2, a client file 108 is a conveniently organized and formatted collection of information pertaining to an individual client. Access to multiple dealership databases 128 enables client files 108 to incorporate information from more than one dealership database 128. In effect, this allows client files 108 to incorporate information about an individual client that was gathered from different dealerships or sales organizations. For example, a client who interacts with a first dealership may have records or information recorded in a first dealership database 128. The same client may visit a second dealership and therefore may have information recorded in a second dealership database 128. By having access to the first and second dealership databases 128, the client's file 108 can potentially reflect a more complete and accurate set of information pertaining to interaction with the client.

In accordance with one embodiment, client files 108 incorporate information about an individual client that was gathered from multiple dealerships owned by a single entity. In accordance with another embodiment, client files 108 incorporate information about an individual client that was gathered from multiple dealerships owned by a multiple entities (e.g., multiple entities that have an information-sharing agreement with one another). In accordance with still another embodiment, client files 108 incorporate information about an individual client that was gathered from multiple dealerships that are affiliated with a single enterprise (e.g., a Ford employee is able to access a client file 108 that includes information gathered from all Ford dealerships throughout the world).

Illustratively, one owner may own multiple dealerships and desire to be aware, through a client file 108, of client interaction with any of the owner's dealerships. Or, several dealership owners may agree with one another to share dealership database 128 information with one another, so as to enable client files 108 to reflect client interaction with any of the agreed upon dealerships.

C.) Plans/Forecasts 110

In the context of plans/forecasts 110, access to multiple dealership databases 128 is beneficial for a variety of reasons. As was described above, the accuracy of plans/forecast 110 illustratively increases as the amount of available data increases. Therefore, by combining multiple dealership databases 128, the amount of available data increases and the accuracy of a plan/forecast 110 increases. Referring to FIG. 3, the dealership databases 128 contained in combination database 328 may correspond to dealership or sales organizations owned by a single owner or may be a collection of dealerships or sales organizations owned by numerous owners. In accordance with one embodiment, as will be described below in relation to FIG. 4, a dealership or sales organization might be able to pay a fee in order to have access to more dealership databases 128, and therefore access to more accurate plan/forecast 100.

In accordance with one embodiment, a dealership that pays a fee to access information from other dealerships is not allowed to access private information from other dealerships (e.g., customer phone numbers, addresses, etc.), but is only allowed to generally analyze non-private information associated with other dealerships. For example, a given dealership may be allowed to analyze client interaction patterns from another dealership in order to create a plan/forecast 110 that is more accurate, but the same dealership is not allowed to pull an address from another dealership's client list.

D.) Goals Information 112

In the context of goals information 112, access to multiple dealership databases 128 is beneficial for a variety of reasons. As has been mentioned above, a single owner may own multiple dealerships and desire to have simultaneous access to dealership database 128 information pertaining to all of the dealerships. Within system 300, goals manager 124 can be utilized to establish, maintain and monitor goals that pertain to multiple dealerships rather than just a single dealership. For example, an owner may desire to sell a certain number of units, see a certain number of clients, or set some other goal for all of his dealerships combined, rather than just a single dealership.

E.) Daily Planner Information 114

In the context of daily planner 114, access to multiple dealership databases 128 is beneficial for a variety of reasons. As was discussed above, contact manager 126 is illustratively utilized in the creation of daily planner 114 information. Contact manager 126 works in conjunction with database manager 118 and specifically in conjunction with analysis component 122 to analyze data to make predictions similar to plan/forecast 110. As was stated in the context of plan/forecast 110, the accuracy of these types of predictions improves as the amount of data available for analysis increases. Therefore, the tasks assigned by contact manager 126 within daily planner 114 are more likely to lead to successful outcomes when the analysis upon which the tasks were chosen is reliant upon a greater body of available data, such as multiple dealership databases 128.

Greater database access also illustratively translates into a greater access to inventory information. Accordingly, contact manager 126 will match more inventory items to more clients' expressed interests.

4. Access Control

Figure 4:
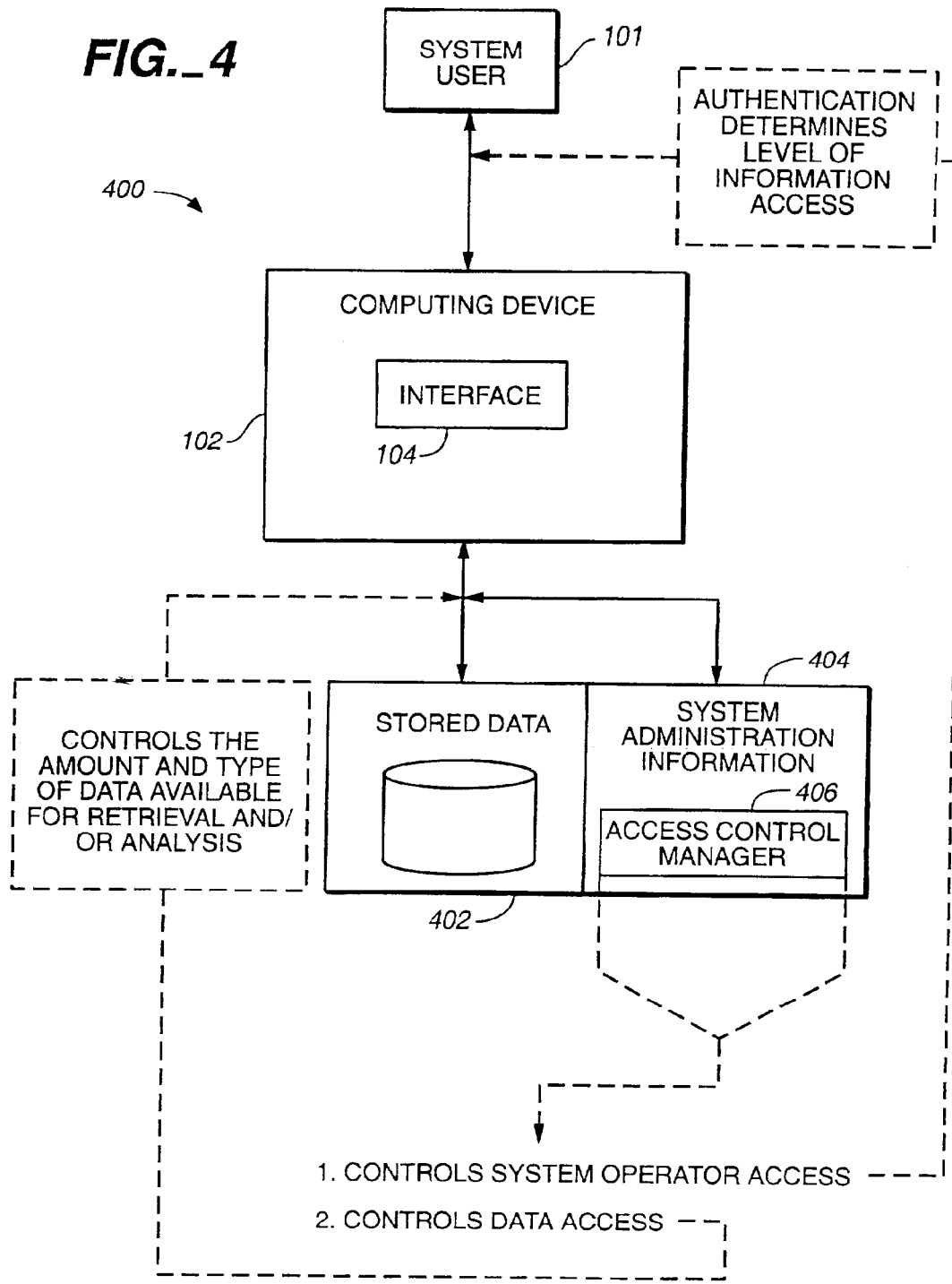
FIG. 4 is a schematic block diagram of an information access system.

FIG. 4 is schematic block diagram of an information access system 400 in accordance with another aspect of the present invention. The same reference numerals are used in FIG. 4 for elements that are the same or similar to those elements illustrated and described in relation to previous Figures.

System 400 operates in a manner that is similar to the operation of systems 100 and 300 described above in relation to FIGS. 2 and 3 respectively. Within system 400, user 101 interacts with computing device 102 through an interface 104 in order to access information that is retrieved from, or derived based on, data contained within a collection of stored data 402. The information to which user 101 is given access may include any of the information types discussed above in relation to FIGS. 2 and 3. Stored data 402 includes one or more dealership databases 128 (FIG. 2) and may be configured similar to database 328 (FIG. 3). Although not specifically indicated, system administration information 404 includes goals manager 124, database manager 118 and/or contact manager 126, each of which operates as described above in relation to FIGS. 2 and 3.

Stored data 402 and system administration information 404 are accessibly stored in a location external of computing device 102. Computing device 102 is illustratively a client-type computing device capable of interaction with stored data 402 and system administration information 404, which are illustratively stored and maintained on one or more server-type computing devices. Computing device 102 is utilized to remotely interact with system administration information 404 and stored data 402 utilizing a remote connection such as but not limited to those described in relation to FIG. 1.

System administration information 404 includes an access control manager 406. One general purpose of access control manager 406 is to limit information access by a particular system operator based on a verified level of authentication. In effect, access control manager 406 requires a system operator (e.g., user 101) to authenticate his or her self (e.g., enter a password, provide a physical authentication, etc.) in order to access certain items of information through interface 104. Under the control of access control manager 406, different authentication information illustratively provides access to different ranges of information.

EXAMPLE

User 101 is the owner of a dealership that utilizes system 400. Accordingly, upon proper authentication, access control manager 406 provides user 101 with full access to all available information through interface 104.

EXAMPLE

User 101 is an employee of a dealership that utilizes system 400. Accordingly, following authentication, access control manager 406 provides user 101 with only limited access to information through interface 104. Illustratively, different employees might be granted access to different information. For example, one employee's authentication might provide access to daily planner 114 information but may not provide access to goals information 112. Or, a manager's authentication might provide access to change or adjust goals information 112 while a lesser employee's authentication may not provide such access.

In accordance with another aspect of the present invention, access control manager 406 is further configured to control access to stored data 402. For example, access control manager 406 may provide access to information pertaining to user 101's dealership database(s) 128 while preventing access to information pertaining to the dealership databases 128 of others. In accordance with one embodiment, user 101 (or his or her dealership) can pay a fee to gain access to information contained within the dealership database(s) 128 of others. The fee illustratively increases based on the number of dealership databases 128 of others to which user 101 (or his or her dealership) desires access. Illustratively, access to the information of other dealerships might be limited to non-confidential information, such as historical listings of nameless client-dealership interactions that can be used to facilitate creation of plans/forecasts 110 and/or daily planner 114 information. Access control manager 406 can illustratively be manipulated and is generally configured to control the amount and type of data available for retrieval and/or analysis.

In accordance with one aspect of the present invention, a commercial entity owns and maintains the system administration information 404 and stored data 402. The commercial entity allows users associated with a dealership to access and utilize system administration information 404 using at least one computing device 102 (the commercial entity may charge a fee for this access/use). The owners or managers of the dealership are able to utilize access control manager 406 to desirably grant and deny access to specific types of information based on authentication of a particular system operator. The commercial entity utilizes access control manager 406 to control access to stored data 402. Accordingly, the commercial entity controls the amount and type of information stored in stored data 402 to which the dealership entity is allowed access using computing device 102. The dealership entity may wish to pay the commercial entity a fee in order to gain greater access to stored data 402. For example, the dealership entity may desire to do so in order to be able to provide its managers and/or sales people with more accurate plan/forecasts 110 or more accurate task assigning through contact manager 126 and daily planner 114 information. In accordance with one embodiment, the dealership entity may pay the commercial entity a fee in order to utilize additional computing devices 102 within system 400.

5. Compilation of Data

Figure 5:
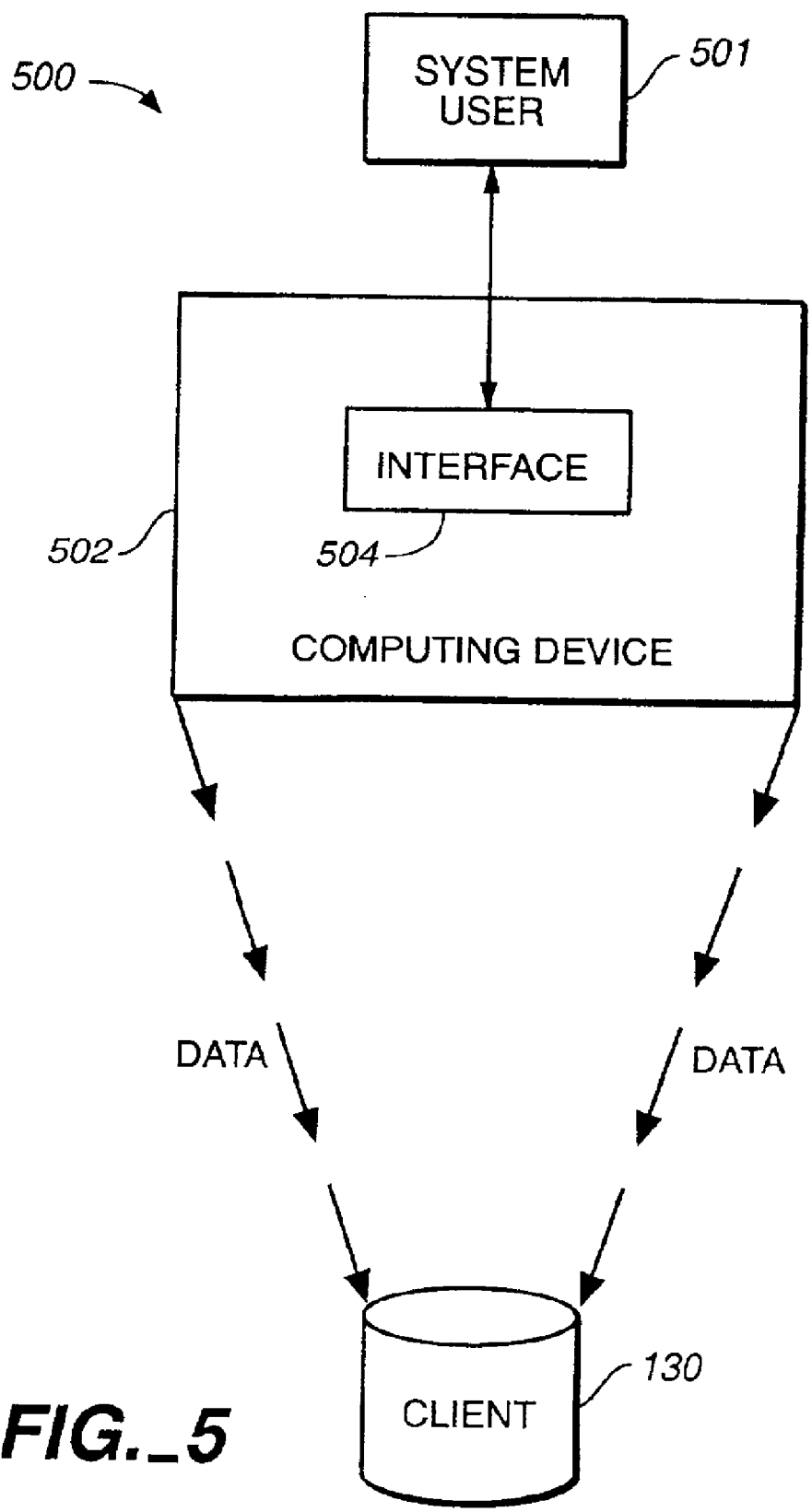
FIG. 5 is a schematic block diagram of an information input system.

FIG. 5 is a block schematic diagram of an information gathering system 500. Within FIG. 5, elements that have the same or similar functions as compared to previously described elements have been similarly or identically labeled. System 500 is configured such that a system user 501 interacts with a computing device 502 through an interface 504 in order to facilitate the process of making a sale. As a product of this interaction, data corresponding to the events involved in the sales processes is transferred and stored within a client sub-database 130. The client sub-databases 130 are then utilized as described above in relation to previously described Figures.

Illustratively, computing device 502 may be the same device as, or a device independent from, a computing device through which information is accessed (e.g., device 502 may actually be device 102 described above or can be a totally independent device). Device 502 can be any of a variety of computing devices including a PDA, some other handheld computing device, a wireless communication device, a PC, a microprocessor-based or programmable consumer electronic computing device, a cell phone or some other computing device. System 500 illustratively supplies the client databases 130 with information. The function of databases 130 is described above in relation to other aspects of the present invention.

System user 501 may be a client who directly interacts with computing device 502 and indirectly creates and maintains a client sub-database 130 for his or herself. Alternatively, system user 501 may be a person that is internally affiliated with a sales-oriented organization and works with a client to interact with computing device 502 on behalf of the client. Accordingly, user 501 indirectly creates and maintains a client sub-database 130 for the client.

Figure 6:
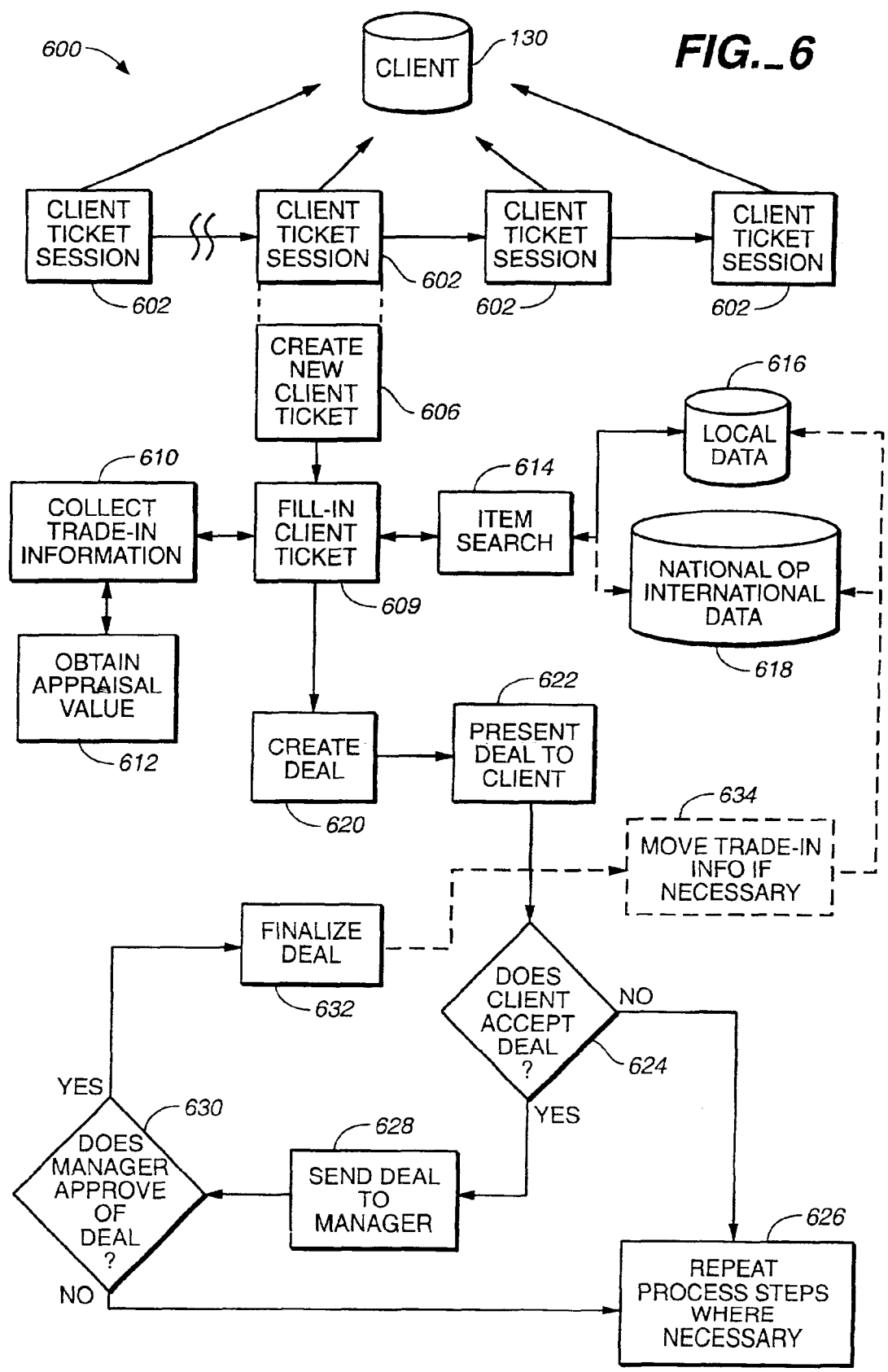
FIG. 6 is a block flow diagram of a software system.

FIG. 6 is a block flow diagram that illustrates a data capture flow process, which is illustratively implemented as a software system 600. Within FIG. 6, elements that have the same or similar functions to previously described elements have been similarly or identically labeled. Software system 600 may be directly implemented on a computing device (e.g., computing device 502 in FIG. 5 or devices 102 in FIGS. 2, 3 and 4). Alternatively, software system 600 may be implemented utilizing a client-type computing device that remotely operates the necessary software, which is accessibly stored on a server-type computing device. For example, computing device 502 can access software system 600 across a network connection, such as an Internet connection.

In the context of FIG. 5, computing device 502 utilizes software system 600 to facilitate the supply of data to client sub-database(s) 130. Accordingly, FIG. 6 shows the type of data information that is stored within each client sub-database 130 during and following the FIG. 5 human-computer interaction(s).

In the context of FIG. 4, software system 600 is illustratively included as a component of system administration information 404. Accordingly, a system operator (e.g., user 101) is able to operate system 600 so as to supply data to client sub-database(s) 130, which is stored within stored data 402. Illustratively, software system 600 is owned and maintained by a commercial entity (e.g., the same above-described "commercial entity" that maintains stored data 402 and the other components of system administration information 404). The commercial entity allows at least one dealership entity (e.g., user 101's dealership) to utilize software system 600 to facilitate its business and sales operations. The commercial entity might or might not charge a fee for the dealership entity's use of software system 600. As was described above, the commercial entity might also charge a fee for information access and for adding additional computing devices to system 400 (e.g., devices used to operate software system 600).

As will be described in detail below, software system 600 effectively and efficiently supports a dealership's sales activity while at the same time efficiently and consistently forces the capture of data related to client information of many potential types and from many potential sources. This capture of data enables substantial industry improvements in information accountability, accuracy, and access. These improvements are particularly realized when the data capturing process of software system 600 is implemented to provide data for information access systems such as systems 100, 300 and 400 described above in relation to other Figures.

6. Characteristics of System 600

A. Qualified Client Contact

In accordance with one general aspect of the present invention, system 600 is a software-oriented customer management system designed to directly facilitate a sales process, while indirectly compiling a particularly useful collection of data. Within system 600, a client ticket session 602 is a software-facilitated series of steps that if completed will track and facilitate a sales process from the beginning (e.g., initial client contact) to the end (e.g., finalization of a deal). Client ticket sessions 602 that are not completed will not lead to a complete sale. Information compiled during both completed and incomplete client ticket sessions 602, however, is recorded within database(s) 130 and made available for analysis (e.g., information from both complete and incomplete sessions is useful to the creation of plans/ forecasts 110, etc.).

A client ticket session 602 is illustratively initiated when a seller receives a "qualified client contact." A qualified client contact is an element of the typical sales process and is generally defined, for the purpose of the present description, as an expression of interest in the purchase of a product. In other words, a qualified client contact is a sale opportunity. Potential buyers can communicate qualified client contacts to sellers in different ways, including but not limited to:

1. Phone calls;
2. E-mails;
3. "Walk-ins";
4. Completing purchase interest surveys (e.g., paper, electronic and/or telephonic surveys) that include information that is transferred to a seller; and
5. Through a variety of potential computer network interfaces including but not limited to wireless devices and interactive web pages.

A Client ticket session 602 is initiated upon a seller's receipt of a customer qualified contact. A client on his or her own can manually initiate and carry out a client ticket session 602. For example, a client might initiate and carry out a client ticket session 602 utilizing an intuitive web site or by entering information into a computer at a convention or trade show. Alternatively, an employee of a seller might initiate and carry out a client ticket session 602 on behalf of a client. For example, a salesperson might personally interview a client and interact with a computing device to carry out a client ticket session 602. Or, a salesperson might indirectly receive information from a client (a phone message, a completed survey, information gathered at a convention or trade show, an email, etc.) and utilize a computing device to initiate and carry out a client ticket session 602 on the client's behalf.

A salesperson is not necessarily an essential element. The software can be configured for internal employee use (within seller's sales locations) or for direct use by the client. The software system can be configured to operate as a self-sufficient client driven model, such as an Internet or web-based software system.

Client ticket sessions can be automatically initiated and carried out by a computing device. For example, a computer might be configured to automatically parse information from a phone message (or an e-mail, or an electronically completed customer survey, or some other client communication), to analyze the information, and to automatically initiate and carry out a client ticket session 602 when appropriate.

Client ticket sessions 602 are generally initiated and carried out through interactive communication with software (system 600 software) that is maintained on a computing device (e.g., computing device 502 in FIG. 5). In accordance with one embodiment, the interactive communication is directly made with the computing device upon which the necessary software is stored and maintained. Alternatively, however, the interactive communication is made utilizing any of a number of remote computer communication methods that include but are not limited to wireless and wired communication with remote computing devices over a network, for example communication over a LAN, WAN, and/or the Internet (the necessary software is stored and maintained on the remote computing device). In addition to these methods of initiating and carrying out client ticket sessions 602, other methods of communication are conceivable and are within the scope of the present invention.

In accordance with one general aspect of the present invention, a client ticket session 602 is initiated upon receipt of a qualified client contact. After a given period of time (illustratively 24 hours), the client ticket session 602 expires. An expired client ticket session 602 can no longer be manipulated or utilized to complete a sale. If one client triggers the production of multiple qualified client contacts over a period of time, a separate client ticket session is created for each individual qualified client contact.

EXAMPLE

On Monday, a potential customer e-mails a car dealership. In the e-mail, the potential customer states her name, phone number, and that she is interested in purchasing a particular red Corvette that the dealer has in stock. Software may be used to facilitate the parsing of the e-mail and the initiation and carrying out of a first client ticket session 602.

On Tuesday, the same customer visits the dealership and is introduced to a salesperson. The client tells the salesperson that she wants to trade in her van on the purchase of the Corvette. In order to make a sale, the salesperson must initiate a second client ticket session 602. The system does not allow the salesperson to continue the first client ticket session 602 to add the van trade-in. Each client ticket session 602 is dated individually and aged, and will expire after a predetermined period of time. Information pertaining to all client ticket sessions 602 (whether the sales process is completed or not) is stored within its corresponding (e.g., the corresponding client's) client sub-database 130.

An unqualified client contact, for the purpose of the present description, is a client contact that cannot reasonably be classified as a sale opportunity. A client ticket session 602 need not be initiated for unqualified client contacts. For instance, if a salesperson calls a potential customer to wish them a Happy Birthday, a new client ticket session 602 need not be initiated. Instead, software system 600 is illustratively configured to facilitate the recordation and storage of comments for subsequent retrieval, without requiring initiation of a client ticket session 602.

Comments are illustratively stored in a client specific format and are either stored within client databases 130 or otherwise accessibly stored in a database and made available for retrieval and access. In accordance with one embodiment, client files 108 (FIGS. 2 and 3) are configured to include comment information or to at least provide access to comment information. For example, client files 108 may include a selection choice (e.g., a hyperlink) that causes a particular client's comment history (comment history illustratively includes dated details of each comment) to be retrieved and displayed. Illustratively, comments or an access point to comments (such as a pointer into another database) may or may not be included within a retrieved client file 108 (FIGS. 2 and 3), depending on particular system configurations, which a seller can desirably manipulate.

B. Client Ticket Sessions 602

It should be noted that client ticket sessions are highly customizable and may vary greatly depending on a given sales industry and depending on a specific seller's preferences. The illustrated (FIG. 6) client ticket session 602 generally pertains to the car sales industry and should be considered only one sample application of a highly customizable system.

A client ticket session 602 is generally a software facilitated gathering of information (gathered either from human or automated input) that generally shadows the procedural steps encountered during the process of making a sale. While the details of only one client ticket session 602 are specifically illustrated in FIG. 6, the other client ticket sessions 602 are illustratively the same or substantially similar.

A client ticket is generated during each client ticket session 602. A client ticket is a generally standardized collection of information that is gathered during the client ticket session 602. As will be discussed below, a completed client ticket can be used to generate a deal and to facilitate and document a sale after a deal has been accepted.

The information collected during each client ticket session 602 is illustratively stored within client sub-database 130, which is illustratively associated with a specific client. Information from each individual client ticket session 602 is stored so as to be distinguishable from the information generated during other client ticket sessions. A time and/or date corresponding to the initiation of each client ticket session 602 is illustratively kept track of and identifiable, so as to be utilized for subsequent comparative purposes.

In accordance with one embodiment, after a client ticket session 602 is initiated, it will expire after a certain period of time, wherein expiring comprises changing to a state wherein no new information can be entered during that client ticket session and on the associated client ticket. In accordance with one embodiment, client ticket sessions 602 expire after 24 hours. After a client ticket session 602 has expired, a new client ticket session 602 must be initiated in order to enter new client ticket session information.

In accordance with one aspect of the present invention, client ticket session 602 begins when a system user interacts with software so as to initiate a client ticket session. For example, the system user might use a computer input device to select an "initiate client ticket session" option (such as by clicking on an icon).

Figure 7:
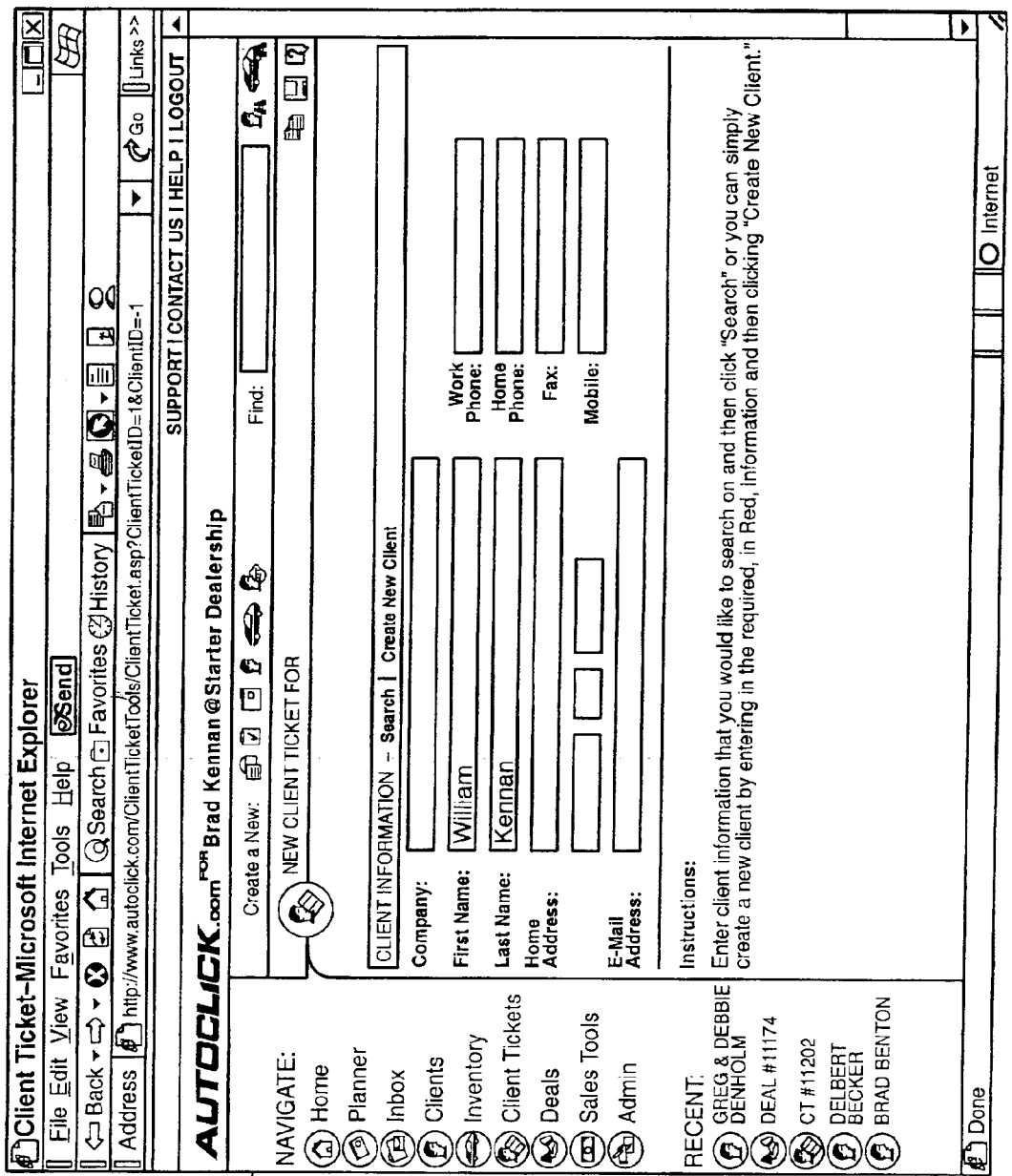

The software then illustratively provides means for determining which client will be the subject of the client ticket session 602. Sample screen 607 in FIG. 7 is an example of a software input screen that is provided to assist a system user in selecting a desired client.

If the client is brand new to the seller, the system operator illustratively selects the "create new client" option. When the create new client option is selected, the software then provides means for inputting personal and contact information for the new client.

Sample screen 608 in FIG. 8 is an example of an input screen that is provided by the software to assist a system user in compiling personal and contact information for a new client. After the personal and contact information has been recorded, the information is saved (e.g., saved in client sub-database 130 or in some other accessible database location) and a client ticket is created for the new client. The personal and contact information is illustratively stored in a location where it is available for incorporation into client files 108 (FIGS. 2 and 3). Block 606 in FIG. 6 represents the creation of a client ticket for the new client.

A system user might not know whether a client is new to the seller. The software can therefore provide a means for searching through a database (e.g., database 128 or 328 described above) of the seller's clients to determine if the client is new. In accordance with one embodiment, a software-driven client search engine is provided to assist in the retrieval of client information that was previously collected from the client. The input sample screen 607 (FIG. 7) demonstrates one example of how the software might enable such a search to be performed. A system operator can illustratively fill in any of a number of fields (e.g., last name, first name, company, E-Mail address, etc.) and search through the seller's client information for matching information. In this way, a system user can determine if the present client already has personal and contact information on file.

If the present client already has personal and contact information on file, then the system operator can create a new client ticket without re-entering the previously recorded personal and contact information. In accordance with one embodiment, a system user is allowed to update or add to previously recorded personal and contact information if necessary. When the returning client has been identified and their information has been updated if necessary, a new client ticket is created for the returning client. Block 606 in FIG. 6 represents the creation of the client ticket for the returning client.

Sample screen 611 in FIG. 9 is an illustration of a computer input screen that is one example of a portion of a client ticket created during a client ticket session 602. The client ticket illustratively includes fields that are directly or indirectly filled in during a client ticket session 602. All client ticket information need not necessarily be included on a single input screen (e.g., a client ticket may include multiple screens). In accordance with one embodiment, the input screen includes a general information view that shows only a limited amount of information and an extended view that shows a greater amount of information. Sample screen 607 is illustratively an example of a general information view. As is illustrated, more fields are viewable as the screen is "scrolled down" to reveal additional information.

In accordance with one embodiment, if the client associated with the client ticket session 602 is new to the seller, then all information entered into the client ticket will be derived from the present client ticket session 602. If, however, the client has prior client ticket information from prior client ticket sessions 602 stored in the seller's database, reproduction of information from prior client tickets for incorporation into the present client ticket may be possible and the software can facilitate such a reproduction. However, prior expired client tickets (client tickets from client ticket sessions that have timed out) generally cannot be retrieved and used to directly record subsequent client information. Instead, the information from an expired client ticket session can be imported into a subsequent client ticket session for a returning client so the salesperson need not re-enter all of the data captured during the first client ticket session.

In any case, after a client ticket has been created, the next step is to add information to the client ticket that specifically pertains to the sale opportunity. Block 609 in FIG. 6 represents the filling in of the client ticket. Some of the client tickets fields may illustratively be filled in directly on the client ticket screen itself. Other client ticket fields, however, are associated with their own input screens that are filled in separately, with relevant information being transferred to the client ticket screen automatically.

As is illustrated by the sample client ticket of sample screen 611 in FIG. 9, a client ticket may include information pertaining to a product (in this case a vehicle) that a client wants to trade-in upon the purchase of a different product. Block 610 in the system 600 flow diagram represents the collection of trade-in information. When the software receives an indication that the sale is going to include a trade-in, a specialized input screen (or screens) is illustratively provided to facilitate the collection of trade-in information. Sample screen 613 in FIG. 10 is an illustration of a computer input screen that is utilized to collect trade-in information.

As is indicated by block 612 (FIG. 6), valuation and appraisal services may be integrated into the software to provide an immediate estimate as to the dollar value of an item that is traded in. In the case of the vehicle sales industry, Black Book, Kelly Blue Book, and NADA are all sources of vehicle valuation and appraisal information.

In accordance with one embodiment, as vehicle information is entered into an input screen similar to sample screen 613, at least one of the valuation/appraisal services is integrated into the input page via a computer network so as to provide an instantaneous valuation/appraisal estimate (e.g., valuation/appraisal fields are automatically filled in). In accordance with one embodiment, a seller can create an algorithm to average the separate valuation/appraisal estimates of multiple valuation/appraisal services. In accordance with another embodiment, a seller can create an algorithm to adjust (e.g., systematically raise or lower) the valuation/appraisal estimate(s) as the seller so desires (e.g., extra depreciation added to older vehicles, etc.).

As is illustrated by the sample client ticket of sample screen 611 in FIG. 9, a client ticket may include information pertaining to products (in this case vehicles) that a client is interested in purchasing. Block 614 in the system 600 flow diagram represents the ability to search for and locate an item that the client is interested in purchasing. When the software receives an indication that a search for an item is desired, a specialized input screen is illustratively provided to facilitate the search and location process. Sample screen 615 in FIG. 11 is an illustration of a computer input screen that is utilized to search for specific products. Illustratively, when an appropriate item is located during the search process, it is selected and information pertaining thereto is automatically transferred to the client ticket.

In accordance with one embodiment, the product search associated with block 614 is limited to a local database 616 that contains only inventory directly associated with the seller. For example, inventory associated with the seller can be stored in one of the databases 128 and/or 328 described above and the search can be limited to the data contained therein. Alternatively, the product search includes the inventory of other sellers. Illustratively, it is up to an individual seller whether to allow their inventory data to be searched by other sellers.

In accordance with one embodiment, a commercial entity, such as the commercial entity that owns and maintains software system 600, maintains a database system that contains the inventory of multiple sellers (e.g., stored data 402 in FIG. 4). Illustratively, the commercial entity is able to control which sellers have access to which databases when software system 600 is utilized to perform item search 614. Illustratively the inventory access system is integrated within or configured similar to the information access system described in relation to FIG. 4 (e.g., software system 600 stored within information 404 and inventory data stored within stored data 402).

A first seller might choose not to have other dealerships search their inventory. The commercial entity is able to configure search capabilities to accommodate the first seller's choice. The first seller, however, might wish for their item searches 614 to include the inventory of other sellers who desire their inventory to be searchable. Accordingly, the commercial entity configures item search 614 to include external data 618 in the first dealership's item searches 614. Illustratively, the commercial entity charges certain fees to sellers for certain access to information during item searches 614.

After a client ticket has been created, the information incorporated therein can be used to create a deal. Block 620 within the system 600 flow chart represents the creation of a deal. When the software receives an indication that the creation of a deal is desired, a specialized input screen (or screens) is illustratively provided to facilitate the process of creating a deal. Sample screen 621 in FIG. 12 is an illustration of a computer input screen that is utilized to create a deal.

As is illustrated within sample screen 621, different financial factors can be adjustable so as to have an effect on the total price of a particular product. An individual associated with the dealership or the client themselves might illustratively be provided with the ability to adjust some or all of the financial factors. In accordance with one embodiment, adjustment of certain factors requires a certain degree of authorization. For example, some salespersons might be allowed to adjust the "mark-up" on the product while others may not.

Not illustrated in sample screen 621 is the ability to create a deal involving lease options. Lease option deal making may be incorporated into the system of the present invention. It should be understood that a particular seller can simply tailor the deal making input screen or screens to fit their particular needs, and screen 621 is but one of many potential examples of a deal-making screen.

After a deal has been created, the deal is ready to be presented to the client and/or a seller's manager for approval. Block 622 within the system 600 flow chart represents the presentation of a deal to the client. Sample screen 623 in FIG. 13 is an illustration of a computer display screen that is one example of a display screen that might be provided for presentation to the client. As is illustrated, a picture or graphic of the product at issue may be included. Details pertaining to the product also may be included. Financial values pertaining to list price, trade-in value and the "bottom line" price might also be included.

As is illustrated, the deal (e.g., sample screen 623) can be printed for a client to review or the deal may be emailed to a client for review. As is illustrated by block 624 in the system 600 flow chart, a client decides whether to accept the presented deal. As is indicated by block 626, if the deal is not accepted, then a new deal can be created. As is indicated by block 628, if the deal is accepted, the deal is sent to a manager for seller approval (e.g., the deal is emailed to someone with authority to accept deal on behalf of the seller). As is indicated by block 630, if the manager does not approve of the deal, a new deal can be created. In accordance with one embodiment, the deal is presented to a manager for approval before the deal is presented to the client.

When the deal has been accepted by both the seller and the client, the next step, as is indicated by block 632, is to finalize the deal. Illustratively, to finalize the deal results in formal completion of the sale. Sample screen 631 in FIG. 14 is an example of a software-input screen that is provided to assist a system user in finalizing a deal.

As is illustrated, finalizing the deal includes finalizing financing information for the product sold. Upon finalization of the deal, as is indicated by block 634, the purchased product is automatically removed from the inventory database if necessary and the traded-in product is automatically added to inventory if necessary. Upon a successful trade-in, a traded in product becomes inventory for the seller and is added to the inventory database (unless the seller desires otherwise).

In accordance with one aspect of the present invention, the information entered into an input screen similar to sample screen 613 then becomes searchable as an indicator of inventory. Accordingly, a search consistent with block 614 searches that previously entered information.

In accordance with one aspect of the present invention, the dealer can customize algorithms to automatically impose desired price mark-ups (or otherwise manipulate data) to be indicated when the new inventory is received in a product search. As illustrated by sample screen 613 and in accordance with one aspect of the present invention, a mark-up can also be entered manually. In accordance with one aspect of the present invention, a form similar to sample screen 613 can be used to put inventory into a system even when there has been no trade-in. Of course, this is provided to accommodate inventory bought from auction, new inventory, etc.

When the deal has been finalized, the sale is complete.

C. Daily Planner 114, Client Files 108 and Plans/Forecasts 110 Re-Visited Now that the overall client ticket session has been discussed, additional features of the present system will be described. With reference to FIG. 6, the information gathered during each client ticket session 602 is collected and stored within a client's sub-database 130. As was mentioned in relation to FIGS. 2 and 3, information contained within client sub-databases 130 may be made accessible for review and/or analysis.

As was discussed in relation to FIGS. 2 and 3, an authorized system operator may access client files 108 that include information retrieved from, or derived based on, information contained within client sub-databases 130. A client file 108 is generally a collection of data that pertains to one specific client and provides an interface to a system user that allows the user to access a complete summary of information. While the precise contents of a client file 108 can be tailored to fit a particular seller's needs and desires, a typical client file might include:

Client personal information (address, contact information, etc.):

This information can be updated or edited manually at any time.

A listing of all client tickets created during client ticket sessions 602:

Utilizing client files 108, a history of client contacts is easily viewable. Due to the characteristics of the client ticket session 602 process, this history is likely to be complete and accurate. Utilizing client files 108, old client tickets can be accessed and viewed (but not substantively modified). Certain client ticket session 602 information (e.g., client ticket information) is illustratively imported to the appropriate client files 108 automatically.

A listing of repair orders processed by the seller:

Sellers of cars often have vehicle service departments. When repairs are done, a repair order is created. A repair order creation process is illustratively implemented into the presently described system. A repair order creation procedure is similar to the client ticket order creation process described above. A repair order is the service department equivalent of a client ticket. Through the client file interface, a history of service department contacts (in the form of a listing of repair orders) is easily viewable. Due to the characteristics of the repair order formation process (similar to client ticket formation . . . a new repair order created for each service contact . . . etc.), this history is likely to be very complete and accurate. Through the client file interface, old repair orders can be viewed (but not substantively modified). Repair orders are imported to the client file automatically.

Comments and notes entered by salespeople or others:

These comments can include listings of unqualified contacts as recorded in a comment or comments. These are entered manually.

Other types of information:

Many other types of information can be manually entered or automatically imported into the client file (e.g., financing information, insurance information, etc.) Automatically imported in this context means it is input at another location (at a financing institution, insurance company, other divisions within the seller's business, etc.) and imported into the client file.

Manually entered in this context means a client file includes some fields or information items that, by design, can be directly edited. The present invention is thus not to be limited to specific information discussed herein.

How information gets into the client file varies. Client tickets, repair orders, etc. are illustratively automatically imported to a client ticket. Updated client contact information, client addresses, etc. are illustratively entered manually (directly) or imported from recent client tickets, repair orders, etc (indirectly). Comments can be entered directly by salespeople, managers, etc or imported indirectly.

In some instances, client ticket sessions 602 may be initiated and carried out without direct knowledge of, or interaction with, a salesperson. For example, the client can initiate session 602 or session 602 can be initiated automatically by a computing device. Substantially the entire session can be carried out automatically with little or no salesperson involvement until the deal is finalized. The session is simply driven automatically by a computer (e.g., a computer that parses information from an e-email) or by directly prompting the user through the process.

Daily planner 114 (see FIGS. 2 and 3) provides sales people with organizational tools to manage clients and client tickets that are generated from both direct and indirect contact with a client. Sample screen 637 in FIG. 15 is an illustration of a computer input screen that is an example of what a computer illustratively provides as part of daily planner 114. Illustratively, a particular client can be selected in order to gain access to a listing of the client's information from session 602.

The nature of the organizational tools associated with daily planner 114 is highly customizable. Lists of active clients, those still interested in purchasing, are illustratively maintained and made accessible as part of daily planner 114. Salespeople are able to immediately look at an active client's sessions 602 (and related client tickets) to determine where the client might be in terms of deciding to make a purchase. Lists of non-active clients are illustratively also accessible. Historical listings of client ticket sessions 602 and related client tickets are illustratively accessible. These are only a few of the many daily planner 114 functions that can be created to facilitate client-staff interaction during the sales process.

Illustratively, the organizational tools associated with daily planner 114 are part of a computer application program that is executed and operated by a computer-processing unit. The computer application program contains rules that are executed during operation of the program. A system user may manipulate the rules. The computer application program may be a separate and individual program or part of a more sophisticated and complex program with additional program components.

As was also discussed in relation to FIGS. 2 and 3, the information contained within client sub-databases 130 may illustratively be analyzed and, based on that analysis, tasks may be assigned to sales people through daily planner 114 and plans/forecasts 110 may be generated. In accordance with one aspect of the present invention, the analysis that is performed involves the comparison of client ticket sessions 602. For example, analysis might lead to the following conclusions that can be the basis of a daily planner 114 task or a plan/forecast 110:

Example Conclusion

Examining a plurality of client sub-databases 130 and examining client ticket sessions 602 contained therein reveals that client ticket sessions 602 are twice as likely to include a completed sale if they indicate that a client personally tested the product (e.g., took a test drive).

Example Conclusion

Examining a plurality of client sub-databases 130 and comparing client ticket sessions 602 contained therein reveals a trend that client ticket sessions 602 initiated based on a qualified client contact received from a client via email will be more likely to lead to a completed sale if a client contact session 602 is initiated by a salesperson over the phone following receipt of the email.

Illustratively, because the client ticket sessions are time and date stamped, analysis might lead to the following conclusion that can be the basis of a daily planner 114 task or a plan/forecast 110:

Example Conclusion

Examining a plurality of client sub-databases 130 and comparing client ticket sessions 602 contained therein reveals a trend that client ticket sessions 602 initiated based on a qualified client contact received from a client via email will be more likely to lead to a completed sale if a client contact session 602 is initiated by a salesperson over the phone following receipt of the email. In order to improve the odds of completing the sale, in the summer, the salesperson should call at least within one day of the client's email and in the winter, the salesperson should wait a day before making the call. In this case, an event will automatically be entered into the daily planner of a salesperson to follow up with the client on the most desirable day.

These are only several of many potential examples of analysis that can be performed utilizing information derived from or based on client ticket sessions 602. In accordance with one embodiment, a seller can manipulate the input screens for client ticket session 602 in order to enable certain types of analysis.

7. Additional System 600 Information In accordance with one embodiment of the present invention, the process of making a sale utilizing system 600 is generally carried out as follows:

[START]
1) Client ticket creation/execution→
2) Deal creation/execution→
3) Buyer's order creation/execution
[FINISHED]

A buyer's order is illustratively an element that is created after the buyer and seller have accepted a deal. In other words, a buyer's order is an element created during the finalize deal 632 step of the process embodied by system 600. The information that the buyer's order contains can illustratively be tailored to a specific seller's needs and preferences. Typically, a buyer's order will generally include information related to the deal. The buyer's order can be specially designed and formatted for use during the deal finalization process. For example, a finance department might utilize the buyer's order to assist in arranging payment details.

In the context of software system 600, three things generally happen during the process of making a sale. First, a new client ticket session 602 is initiated, even if the qualified client contact that the session 602 is based on is not the first qualified client contact. Second, the procedures defined by the various fields are executed and complied with during the client ticket session, so as to systematically create a deal. Third, the deal is finalized. In accordance with one embodiment, the third step is the creation and utilization of a buyer's order.

In accordance with one embodiment, three things must happen in order for a sale to be completed utilizing system 600. The same three things must happen for a sales representative of the seller to complete a sale. First, a new client ticket session 602 must be initiated, even if the qualified client contact that the session 602 is based on is not the first qualified client contact. Second, the procedures defined by the various fields must be executed and complied with during the client ticket session, so as to systematically create a deal. Third, the deal is finalized. In accordance with one embodiment, the third step is the creation and utilization of a buyer's order.

In accordance with one embodiment, system 600 is configured such that completion of each of the three steps is dependent upon the occurrence of the proceeding steps. For example, a sales representative cannot create a deal without initiating a client ticket session and creating a client ticket. Similarly, the sales representative cannot create a buyer's order without out creating a deal, and therefore without initiating a client ticket session and creating a client ticket session. Configuring system 600 in this way virtually guarantees that data pertaining to almost all important sales-related events is captured. A sales representative cannot whip up a deal for a client without first initiating a client ticket session and creating a client ticket. A sales representative cannot create a buyer's order without first initiating a client ticket session, creating a client ticket and creating a deal.

Generally speaking, system 600 is designed around qualified client contacts (sale opportunities). When system 600 is operated correctly, every qualified client contact will generally be accounted for with a recordation of information having a simple and consistent format. Illustratively, even those qualified client contacts that do not involve interaction with a seller's sales representative are accounted for and information is recorded in accordance with the same simple and consistent format.

Utilizing an information interface such as client files 108 or daily planner 114, a seller's sales representative is able to gain immediate awareness of the client's history of qualified customer contacts, including when the qualified contact was made, for example, with another sales representative, on the lot with a PDA after business hours, or on the Internet.

Accordingly, system 600 enables the efficient and automatic generation of an accurate and detailed client history that is based on the sales process itself. For example, a salesperson, utilizing an information access interface such as a client file 108, can immediately ascertain the contact history of the client sitting in front of them (e.g., the client E-mailed one salesperson two days ago, called another salesperson yesterday). System 600 also enables the generation of data in a beneficial format that enables a wide range of analytical opportunities.

Because a sale generally requires compliance with the procedures mandated by the software screen fields, and because every time a qualified client contact is received, a generally pure and consistent data pool is maintained.

It should also be emphasized that the system 600 can be configured to meet a particular seller's needs. System 600 can be specially configured to generate a specific data element. In accordance with one such embodiment, a car dealer who utilized system 600 desires to keep track of any time a client takes a car for a test drive. Within the dealer's organization, all test-drives require the checking out of a special license plate. Illustratively, the dealer may require license plates to be checked out and noted by filling in a field on the client ticket during the client ticket session 602. The dealer can deny access to the special plates until the associated field on the client ticket is filled in. By doing this, the dealer is then able to identify which qualified client contacts included a test drive by identifying which client tickets include the checking out of the special license plate. This data factor can be included during analysis, etc. This is only one example of how system 600 can be customized to generate a particular type of data, and the invention is not to be so limited.

The seller that implements system 600 generally does not have to rely purely on the diligence of its sales people to keep detailed records of client contact. Neither does the seller have to rely on its sales people to consistently generate and submit reports and lists. Instead, the sales people simply use the system to do their jobs. In the process of using the system to do their jobs, the sales people generate valuable information (statistics, reports, etc.) that can be subsequently retrieved and/or analyzed.

8. Shopping With No Salesperson Assistance

In accordance with one embodiment, software system 600 is intuitively configured such that a client can directly operate it without assistance from a seller's salesperson. The client is not given access to information that is confidential to the seller. After completing a deal, the client is illustratively contacted by a representative of the dealership to finalize the deal, re-work the deal, and/or appraise a trade-in item, etc.

In accordance with another embodiment, a client who wishes to purchase a product interfaces with, and operates, an intuitive software system (e.g., an interactive web site) that is independent of software system 600 and is specially tailored to accommodate a typical client (e.g., no confidential information, etc.). The client, by using the intuitive software package, indirectly initiates and carries out a client ticket session within software system 600. Illustratively, the intuitive software and system 600 are configured to operate in cooperation with one another. After completing a deal, the client is illustratively contacted by a representative of the dealership to finalize the deal, re-work the deal, and/or appraise a trade-in item, etc.

Accordingly, a client is able to create a client ticket, create a deal, submit the deal to a manger for approval, and potentially finalize the deal without assistance from the seller's sales staff. In this way, the client is able to potentially complete a sale at home by operating software that is downloaded or accessed over a network (such as a global computer network).

In accordance with one embodiment, a client is able to directly interact with a seller using a wireless network interface device (e.g., a network adapted cell phone or PDA) to connect to a network maintained by the seller. This enables the client to shop and buy at the seller's location without being bothered by a salesperson. Accordingly, the client can even shop and buy after the seller's regular business hours. The wireless network interface device can belong to the client or might be temporarily borrowed from the seller.

FIG. 16 is a schematic diagram of a system 700 with a client-dealership interaction system. Utilizing system 700, a client can shop at a seller's location without being bothered by a sales staff and even after the seller's normal hours of operation.

In accordance with system 700, a client visits a seller's business with a wireless interface device 702 (e.g., a PDA)

that can belong to the client or might be temporarily borrowed from the seller. The dealership has a wireless network 704 (e.g., a wireless LAN) that forces device 702 to access the seller's web site which is maintained on a server 706. The initial page of the seller's web page detects the browser type. If the browser type is a hand-held PC, a PDA, a cell phone, etc., then a wireless interface introduction page is transmitted to the device. The device is eventually directed to a page maintained on server 708, which includes a software system configured to operate similar to system 600 and initiate and carry out client ticket sessions 602. An identifier is transmitted to server 708 and identifies which seller the transmission is coming from. The client uses device 702 to shop. The client initiates and carries out a client ticket session 602 using either software maintained on server 708 or by using software that is maintained on server 706 and indirectly transfers information to server 708. When the client has finished, they select how they would like to be contacted. A representative of the dealership contacts the client to finalize the deal, re-work the deal, appraise the trade-in, answer questions, etc.

9. Automatic Notification

FIG. 17 is a schematic diagram of an automatic notification method in accordance with one aspect of the present invention. The method is illustratively implemented utilizing software and can be applied within the context of software system 600 (FIG. 6). Simply stated, the method comprises automatically sending a notification, or transferring information, as soon as one general step of a client ticket session 602 is completed and the next step has begun.

For example, with reference to FIG. 17, a first step 802 represents a first step in a progressive flow of software-implemented events that is followed by a second step 804. Upon completion of the events associated with first step 802, automatic notification component 806 acts to automatically send notification 808 and/or information 810 to a predetermined person or destination.

For example first step 802 might represent block 606 ("create new client ticket") and step 804 might represent block 610 ("collect trade-in information") After the new client ticket has been completed and trade-in information is being collected, a software implemented notification component 806 can cause the seller's employee who physically appraises trade-in's to be notified that a client might be trading in a vehicle. Or, notification component 806 can cause information pertaining to the trade-in to be automatically emailed to the employee who physically appraises trade-in's. This is but one example of the many potential applications of the illustrated automatic notification component.

10. Third Party Interaction

In accordance with one embodiment, third parties might desire to have a commercial presence within client ticket sessions. For example, in the context of the vehicle sales industry, an automobile insurance carrier might desire their rates and/or services to be presented during each client ticket session 602. In accordance with one embodiment, at least one third party presence is established within system 600. In accordance with one embodiment, the client is able to directly or indirectly purchase products or services from the third party. As was discussed above, software system 600 may be maintained by a commercial entity. In accordance with one embodiment, the commercial entity charges a fee to third parties who are represented within system 600. In accordance with one embodiment, the third party pays a fee to the commercial entity each time a client purchases the third party's products or services through, or as a result of, using system 600.

11. Conclusion

It should be emphasized that the precise details as to what information is included on a client ticket are extremely flexible. Some of the information gathered during the process may come from sources other than the client or salesperson. For instance, as was mentioned above, in accordance with one aspect of the present invention, information pertaining to market value of a trade-in may be incorporated automatically from independent sources providing market valuation. Similarly, insurance quotes can be automatically incorporated. Also, a system for calculating details pertaining to financing can be incorporated.

System 600 also illustratively permits multiple parties to simultaneously access a client ticket during the client ticket session. This feature allows parties other than a client or salesperson to be involved in the sales process. For instance, in accordance with an embodiment of the current invention, client tickets can be set up so that a manager is notified by e-mail whenever a salesperson reaches a particular point in the sales process. Managers can then directly monitor the status of the occurring deal and provide input if necessary. A manager can adjust the system to varying levels of security. The varying levels of security correspond with different levels of salesperson control and responsibility. For instance, by adjusting the security level, a manager can grant or deny a salesperson the power to perform a trade-in appraisal without the manger's approval or to make a mark-up before a trade-in is transferred to inventory.

Although the present invention has been described with reference to preferred embodiments, workers skilled in the art will recognize that changes may be made in form and detail without departing from the spirit and scope of the invention.

What is claimed is:

1. A computer-implemented method of collecting client contact data, comprising:

opening a client ticket session to create a client ticket;

supplying the client ticket with information; and closing the client ticket session before a sale is executed, and once the client ticket session is closed, limiting further alteration of the client ticket.

2. The computer-implemented method of claim 1 wherein supplying the client ticket with information comprises:

providing client identification information to associate the client ticket with a client; and associating an item with the client ticket.

3. The computer-implemented method of claim 2, wherein supplying the client ticket with information further comprises:

associating a trade-in item with the client ticket.

4. The computer-implemented method of claim 2, wherein associating an item with the client ticket comprises:

searching available inventory for an item desired by the client;

identifying the item; and transferring information to the client ticket that pertains to the item.

5. The computer-implemented method of claim 1, wherein before the client ticket session is closed, the method further comprises:

creating a deal based on the information recorded in the client ticket.

6. The computer-implemented method of claim 1, wherein after the client ticket session is closed, the method further comprises:

prohibiting any creation of a deal based on the client ticket.

7. The computer-implemented method of claim 1, wherein supplying the client ticket with information comprises:
    utilizing a computer input device to manually provide information as prompted by a computer generated display.

8. The computer-implemented method of claim 1, wherein supplying the client ticket with information comprises:
    utilizing a computing device to review a client communication and automatically parse a relevant set of information to be transferred to the client ticket; and
    transferring the relevant set of information to the client ticket.

9. The computer-implemented method of claim 1 further comprising an initial step of:
    obtaining a qualified client contact which is characterized by an instance of interaction with a client that can reasonably be construed as a sale opportunity.

10. The computer-implemented method of claim 9, wherein supplying the client ticket with information further comprises:
    supplying the client ticket with information pertaining to the qualified client contact.

11. The computer-implemented method of claim 10, further comprising:
    repeating said receiving, opening, supplying and closing steps for a plurality of additional qualified client contacts.

12. The computer-implemented method of claim 11, further comprising:
    storing within a database, for each client ticket session, an informational overview that generally archives a collection of events and input information that corresponds to an associated client ticket session.

13. The computer-implemented method of claim 12, further comprising:
    storing with each informational overview an indication of when the associated client ticket session was opened.

14. The computer-implemented method of claim 1, further comprising:
    storing within a database an informational overview of the client ticket session.

15. The computer-implemented method of claim 14, wherein storing the informational overview of the client ticket session further comprises:
    storing the informational overview of the client ticket session with an indication of when the client ticket session was opened.

16. The computer-implemented method of claim 15, further comprising:
    repeating the steps such that a plurality of informational overviews are stored in the database with an indication of when an associated client ticket session was opened.

17. A computer readable data storage device storing computer implementable steps, which, when executed cause a computer to:
    open a first client ticket session, thereby triggering creation of a first client ticket;
    close the client ticket session;
    open a second client ticket session, thereby triggering creation of a second client ticket; and
    analyze data contained in the first client ticket relative to data contained in the second client ticket.

18. A computer-implemented method of recording and tracking interactions between an automobile sales organization and one of its customers, the method comprising the steps of:
    obtaining a qualified client contact which is characterized by an interaction between the automobile sales organization and the customer that can reasonably be construed as a sale opportunity;
    opening a client ticket session to create a client ticket;
    supplying the client ticket with information pertaining to the qualified client contact; and
    closing the client ticket session if a sale is not completed within a predetermined amount of time, and once the client ticket session is closed, limiting further alteration of the client ticket.

19. The computer-implemented method of claim 18, further comprising:
    repeating said obtaining, opening, supplying and closing steps for a plurality of additional interactions between the automobile sales organization and the client.

20. The computer-implemented method of claim 19, further comprising:
    storing within a database, for each client ticket session, an informational overview that generally archives a collection of events and input information that corresponds to an associated client ticket session; and
    storing with each informational overview an indication of when the associated client ticket session was opened.

21. A computer-implemented method for collecting client contact data, comprising:
    generating, for a given client, a multiple client ticket history that represents a plurality of interactions between a sales organization and the given client.

22. The method of claim 21, wherein generating a multiple client ticket history comprises generating at least one client ticket that is associated with a client ticket session that is closed before a sale is executed.

* * * * *

UNITED STATES PATENT AND TRADEMARK OFFICE
CERTIFICATE OF CORRECTION

PATENT NO.        : 6,941,305 B2
APPLICATION NO.   : 10/052575
DATED             : September 6, 2005
INVENTOR(S)       : Brent Magouirk et al.

It is certified that error appears in the above-identified patent and that said Letters Patent is hereby corrected as shown below:

On Title Page, Item (60) Should read, --Provisional Application No. 60/263,019, filed on Jan 19, 2001

Signed and Sealed this

Sixteenth Day of January, 2007

JON W. DUDAS
*Director of the United States Patent and Trademark Office*